(12) United States Patent
Bier

(10) Patent No.: US 7,302,426 B2
(45) Date of Patent: Nov. 27, 2007

(54) EXPANDING A PARTIALLY-CORRECT LIST OF CATEGORY ELEMENTS USING AN INDEXED DOCUMENT COLLECTION

(75) Inventor: Eric A. Bier, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 562 days.

(21) Appl. No.: 10/879,839

(22) Filed: Jun. 29, 2004

(65) Prior Publication Data

US 2006/0026128 A1    Feb. 2, 2006

(51) Int. Cl.
   G06F 17/30    (2006.01)
   G06F 17/00    (2006.01)

(52) U.S. Cl. .................. 707/3; 707/5; 707/6; 707/7; 707/101

(58) Field of Classification Search ............... 707/101, 707/3, 5, 6, 7; 715/513
   See application file for complete search history.

(56) References Cited

U.S. PATENT DOCUMENTS

| | | | | |
|---|---|---|---|---|
| 5,924,108 | A * | 7/1999 | Fein et al. | 715/531 |
| 6,078,924 | A * | 6/2000 | Ainsbury et al. | 707/101 |
| 6,112,203 | A * | 8/2000 | Bharat et al. | 707/5 |
| 6,584,465 | B1 * | 6/2003 | Zhu et al. | 707/6 |
| 6,678,681 | B1 | 1/2004 | Brin | 707/6 |
| 7,117,434 | B2 * | 10/2006 | Novaes | 715/513 |
| 2002/0073119 | A1 | 6/2002 | Richard | |
| 2004/0158799 | A1 | 8/2004 | Brueuel | |
| 2004/0193627 | A1 | 9/2004 | Matsuda | |
| 2005/0022115 | A1 | 1/2005 | Baumgartner et al. | |

OTHER PUBLICATIONS

Bryan, Doug, "Mapping Vendor Spaces Using High-Level Relations," presented at: Society of Industrial and Applied Mathematics 1st International Conference on Data Mining, workshop on Web Mining, Apr. 7, 2001.

Craven, Mark et al. "Learning to Extract Symbolic Knowledge from the World Wide Web," Proceedings Fifteenth National Conference on Artificial Intelligence (AAAI-98) Tenth Conference on Innovative Applications of Artificial Intelligence (IAAI-98), AAAI Press, Menlo Park, CA, pp. 509-516.

(Continued)

Primary Examiner—Don Wong
Assistant Examiner—Thanh-Ha Dang
(74) Attorney, Agent, or Firm—Fay Sharpe LLP

(57) ABSTRACT

One aspect of the invention receives a plurality of possible list elements and determines a first document space size responsive to a first query that incorporates the possible list elements and defines a first document space. It also determines sizes of second document spaces using a second query set containing separate queries each of which incorporates a different proper subset of the candidate phrases and wherein each of the different proper subset has the same cardinality and defines one of the second document spaces. This aspect also ranks the first document space and the second document spaces. Once the document spaces are ranked, documents are identified so that list elements can be extracted from at least one of the identified documents and presented (for example, displayed, returned in a database, returned in response to a function or subroutine call, etc.).

36 Claims, 12 Drawing Sheets

OTHER PUBLICATIONS

Downey, Doug et al. "Learning Text Patterns for Web Information Extraction and Assessment," American Association for Artificial Intelligence, 2002.

Etzioni, Oren et al. "Methods for Domain Independent Information Extraction from the Web: An Experimental Comparison," American Association for Artificial Intelligence, 2004.

Etzioni, Oren et al. "Web-Scale Information Extraction in KnowItAll (Preliminary Results)," WWW2004, May 17-22, 2004, New York, New York.

Freitag, Dayne "Information Extraction from HTML: Application of a General Machine Learning Approach," Proceedings Fifteenth National Conference on Artificial Intelligence (AAAI-98) Tenth Conference on Innovatiove Applications of Artificial Intelligence,(IAAI-98), AAAI Press, Menlo Park, CA, 1998, pp. 517-523.

Perkowitz, Mike et al. "Learning to Understand Information on the Internet: An Example-Based Approach," Journal of Intelligent Information Systems, Mar. 1997, vol. 8, pp. 133-153.

Popescu, Ana-Maria et al. "Class Extraction from the World Wide Web," Proceedings of AAAI 2004 Workshop on Adaptive Text Extraction and Mining, 2004.

Schmandt, C. and B. Arons "Phone Slave: A Graphical Telecommunications Interface," Proceedings of the Society for Information Display, 1985, vol. 26, No. 1, pp. 79-85.

Soderland, Stephen et al. "The Use of Web-Based Statistics to Validate Information Extraction," Proceedings of AAAI 2004 Workshop on Adaptive Text Extraction and Mining, 2004.

Spertus, Ellen "ParaSite: Mining Structural Information on the Web," Proceedings for the Sixth International World Wide Web Conference, Apr. 7-11, 1997, Santa Clara, California, pp. 202-211.

Spertus, Ellen "ParaSite: Mining Structural Information on the Web," published at URL: htt;://decweb.ethz.ch/WWW6/Technical/Paper206/Paper206.html.

Craven, Mark et al. "Learning to Extract Symbolic Knowledge from the World Wide Web," Proceedings Fifteenth National Conference on Artifical Intelligence (AAAI-98) Tenth Conference on the Innovative Applications of Artificial Intelligence (IAAI-98), AAAI Press, Menlo Park, CA, pp. 509-516, 1998.

* cited by examiner

EXPANDING A PARTIALLY-CORRECT LIST OF CATEGORY ELEMENTS USING AN INDEXED DOCUMENT COLLECTION

RELATED APPLICATIONS

This application is related to:

U.S. patent application Ser. No. 10/879,771 entitled "AUTOMATIC DISCOVERY OF CLASSIFICATION RELATED TO A CATEGORY USING AN INDEXED DOCUMENT COLLECTION" filed concurrently herewith, with the same inventors.

U.S. patent application Ser. No. 10/879,843 entitled "AUTOMATIC EXTRACTION OF HUMAN-READABLE LISTS FROM DOCUMENTS" filed concurrently herewith, with the same inventors.

BACKGROUND OF THE INVENTION

1. Field of the Invention

This invention relates to the field of data mining a distributed source of data.

2. Background

Some World Wide Web search engines currently index over a billion web pages. These pages contain information about almost anything of interest to humanity. However, one problem is that an individual who is trying to make sense of an entire body of knowledge often finds it difficult to quickly find the information of interest.

Web Mining systems, next-generation search engines, and Online Shopping tools are examples of attempts to bring relevant information to a user. There is related work in each of these three areas. Mapping vendor spaces using high-level relations, Doug Bryan, First SIAM Int'l Conference on Data Mining, Chicago, Apr. 7, 2001 pages 59-62, describes a Web Mining system that will find vendors (manufacturers) that appear to be related to a given manufacturer. Bryan's system sends queries to a variety of on-line services that produce lists of links or lists of company names (for example, the Google™ search engine and AltaVista™ search engine have a related pages feature; and these and other search engines organize links into directories). In addition, news stories can be thought of as a list of company names where you can consider them related if they are in the same story. Thus, you can extract related company names from each story. Finally, finance portals like CNBC® services, Hoover's® services, and Quicken® services provide written profiles that list related companies. Bryan's technique then combines this evidence that companies are related to form a list of companies that are most related to a given candidate phrase.

Our approach to finding brands, breeds or other search type selections of a category term is different from Bryan's approach in that we start with a search type selection (for example, breed, brand, or some other search type) and a category term (for example, a generic product), not a company name, and find candidate phrases (for example, a set of brands) related to the category term.

A paper, *Learning to Understand Information on the Internet: An Example—Based Approach*, Merkowitz et al., Journal of Intelligent Information Systems, Vol., 8, No. 2, pages 133-153, March 1997 describes the ShopBot and ILA programs. The ShopBot program learns how to use special-purpose search engines found at many on-line vendor sites. It then uses the vendor sites to extract information, such as selling price, for a user-specified product model, from several vendor sites. The ShopBot program helps users find detailed information, once they already know product models.

Aspects of the invention use general-purpose search engines to find candidate phrases, given a user-specified category term and search type selection. Aspects of the invention help users make sense of an entire product space.

*Learning to extract symbolic knowledge from the World Wide Web*, Craven et al., Proceedings of the Fifteenth National Conference on Artificial Intelligence (AAAI 1998), pages 509-516 and *Information extraction from HTML: Application of a general machine learning approach*, Freitag, Proceedings of the Fifteenth National Conference on Artificial Intelligence (AAAI 1998), pages 517-523 disclose a system that populates a knowledge base using information from the World Wide Web.

Freitag's approach is quite different from the approach disclosed herein as Freitag does not use search engine results. In addition, Freitag's approach requires labeled training data (labeled web pages and labeled links). The information-extraction system, SRV, described in these papers does include a sub-technique for placing constraints on phrases. For example, SRV does have rules requiring a word to be capitalized, numeric, all upper case, or all lower case. However, unlike aspects of the invention, no rules are described limiting what specific characters may or may not be present (except that numeric implies a set of digits), nor how many of them may be present.

Etzioni's KnowItAll search engine (under development at the University of Washington) uses a linguistic approach to find data on the World Wide Web and collates it in the form of a list. Because KnowItAll extracts phrases from sentences based on the linguistic role of the phrase and on surrounding words, it is unable to discover phrases in structures other than sentences (for example, phrases in a bulleted list or phrases in a table). In addition, KnowItAll does not account for punctuation between the words of the phrase nor does it verify the correctness of a phrase such as by performing a targeted-site network search.

U.S. Pat. No. 6,678,681 B1 issued to Brin on Jan. 13, 2004, entitled *Information Extraction from a Database*, discloses techniques for extracting information from a database. Tuples of information are searched for, the result of the search is analyzed for a pattern, and then additional tuples of information are searched for in the database that follow the pattern. Brin's technique starts with example strings and searches through a predetermined collection of documents. Brin's technique looks for tuples of information, such as (author, title) pairs, and sorts found tuples based on what text occurs between the elements of each tuple and the order in which they occur. Brin's technique learns and discovers patterns in the text and tags that immediately precede, follow, and divide, the tuples found so far. If good patterns are found, the algorithm will work well. If not, it can diverge. Whereas Brin's method evaluates each tuple based on the number of patterns that it matches, this is a fairly unstable and unreliable metric. While Brin's technique does examine the URL to see if its host name matches the candidate phrase, it does so only to see if the URL is similar to other URLs in which matching tuples have been found. Furthermore, Brin's technique does not accept any information about the desired category of items, but only examples from the category. So, even if it could accept 1-tuples, like "Sony" and "Toshiba", it could not know whether to converge on brands of "DVD player" or "notebook computers", for example. This makes Brin's algorithm susceptible to drift, for example from books into articles. Finally, Brin does not teach how to correct tuples based on additional evidence.

It would be advantageous to have an automatic algorithm for discovering lists of brands, breeds, and other classifications starting with no other information than the type of search type selection and a category term. In addition, it would be advantageous to be able to receive a partial list of candidate phrases (that may include incorrect data) and a category term and to expand and correct the list. Furthermore, it would be advantageous to be able to extract human readable lists from documents and to use the extracted lists.

DESCRIPTION OF THE PREFERRED EMBODIMENTS

Figure 1:
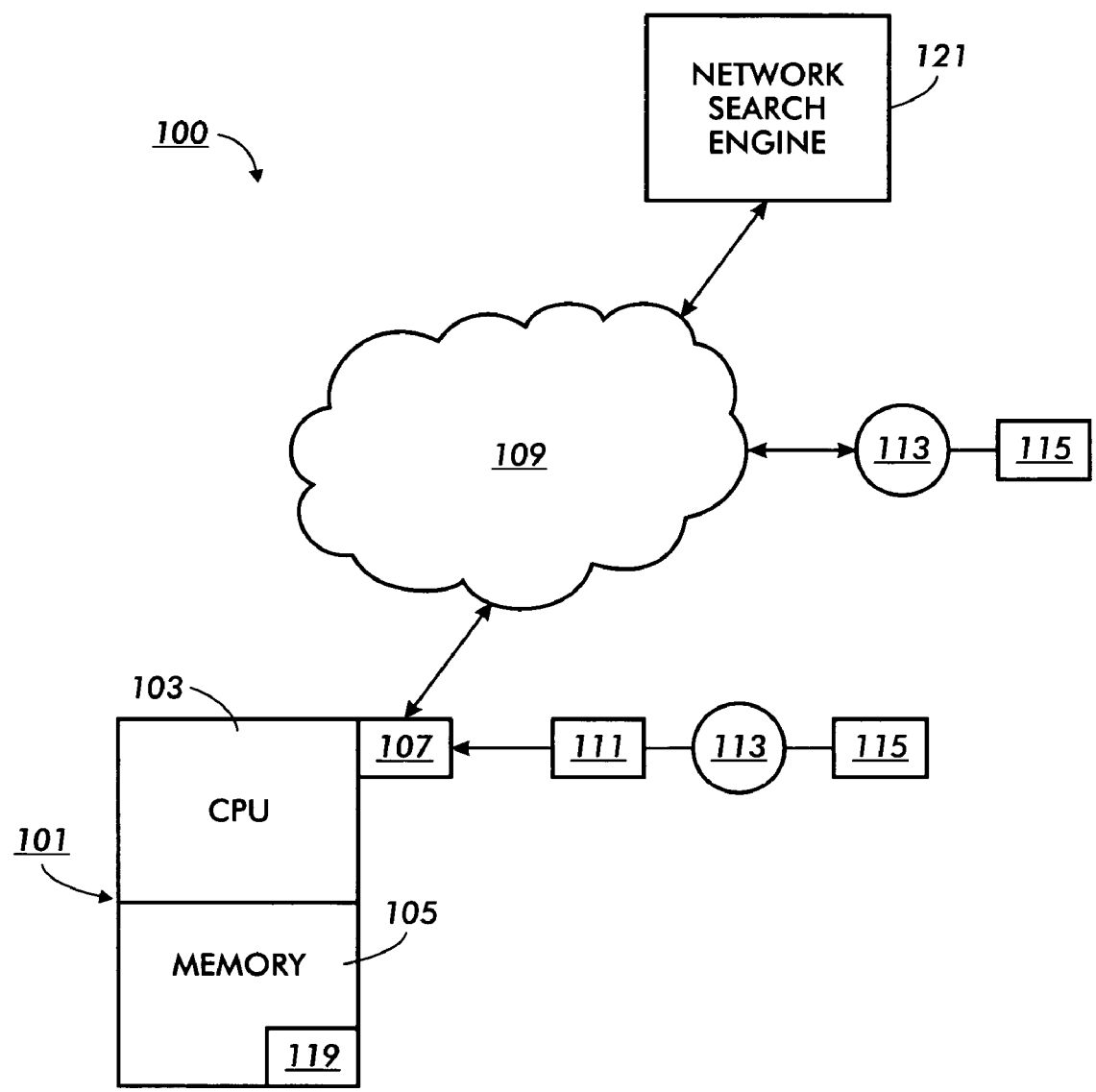
FIG. 1 illustrates a networked computer system in accordance with an embodiment.

One aspect of the invention generates a plurality of candidate phrases in response to a first open-site network search for a category term. This aspect also determines an external score in response to a second open-site network search for at least one of the plurality of candidate phrases. Furthermore, this aspect determines an internal score for the at least one of the plurality of candidate phrases in response to at least one targeted-site network search for the category term. A final score for the at least one of the plurality of candidate phrases is determined responsive to the internal score and the external score. At least one of the plurality of candidate phrases is presented (for example, displayed, returned in a database, returned in response to a function or subroutine call, etc.).

Another aspect of the invention receives a plurality of possible list elements and determines a first document space size responsive to a first query that incorporates the plurality of possible list elements and defines a first document space. It also determines a plurality of sizes of second document spaces using a second query set containing a plurality of separate queries each of which incorporates a different proper subset of the plurality of candidate phrases and wherein each of the different proper subset has the same cardinality and defines one of the plurality of second document spaces. This aspect also ranks the first document space and the plurality of the second document spaces. Once the document spaces are ranked, a plurality of identified documents are identified so that a plurality of list elements can be extracted from at least one of the plurality of identified documents and presented (for example, displayed, returned in a database, returned in response to a function or subroutine call, etc.).

Yet another aspect of the invention extracts a human readable list from a document. It does this by accessing a file that contains data that represents a portion of the document. The data is formatted in accordance with a document formatting description (DFD). The data is parsed into a plurality of tokens that include a plurality of container tokens and a plurality of textual tokens. From the plurality of container tokens, this aspect determines a context for some of the plurality of textual tokens. Once the context is determined, this aspect determines a separator pattern between one of the plurality of textual tokens and an adjacent textual token where both the one of the plurality of textual tokens and the adjacent textual token have the same context. Once the separator pattern is determined, one or more of the plurality of textual tokens can be extracted responsive to the separator pattern. Finally, one or more of the plurality of textual tokens is presented as the human readable list (for example, displayed, returned in a database, returned in response to a function or subroutine call, etc.).

Aspects of the invention are able to find a list of likely brands, breeds, or other classification related to a particular category term (for example, a generic term for a product, service or species), starting with no other information than a specification of a particular category term and the desired search type selection. The desired search type selection can (for example) specify that the search is for a breed, brand, or some other aspect related to the category term. This aspect of the invention has three main modes. First, this aspect finds a set of documents (such as web pages) that are likely to be about the particular category term and extracts candidate phrases from the documents. Second, this aspect rates the candidate phrases, using a database search engine (for example, a web search engine), based on the number of documents/pages that contain each candidate phrase immediately preceding the category term and other terms that are responsive to the search type selection, and generates an external score for the candidate phrase. Third, this aspect computes likely information sources (such as web sites that contain the candidate phrase within the web site identification) that may be about the inputted category term and computes an internal score based on the number of documents/pages supplied by the information source that mention the category term. By eliminating candidate phrase that have a low external score or a low internal score, and combining the scores we arrive at our final result. The web site identification can be a host name, part of the URL, part of the file path, etc.

One embodiment of the invention computes a list of candidate phrases (for example, brands or breeds) given only the search type selection and the product category term (product or species) as input and using live information from the World Wide Web. The following description is generally coached in terms using the World Wide Web, WWW search engines and web pages. However, one skilled in the art will understand that the techniques disclosed herein apply as well to distributed data sources, database access systems, files and documents.

Aspects of this invention focus on a particular information search task, namely finding information related to a "search type selection" and a "category term." In particular, consider a user who wants to know "which set of brands (search type selection) are associated with DVD players (category term)?" or "what breeds (search type selection) are associated with dogs (category term)?" Both of these searches require constructing a list of candidate phrases for the category term. For the DVD player search, we want to find a set of brands of DVD players (that may lead to the name of the company manufacturing the player). For the dog query, we would like a set of breeds. Finding a complete list of candidate phrases will require looking at many web pages because some of these pages may contain examples that are not mentioned in other pages. In addition, because web pages may contain typographical errors and other errors; collecting data from multiple pages allows such errors to be found and corrected. This aspect of the invention can also be applied, for example, to data discovery such as cities (candidate phrase) in a county (category term), books (candidate phrase) by author (category term), music by performer, and categories of shapes, colors, states, countries, currencies etc.

This algorithm does not necessarily return a complete list of all candidate phrases for a category term. In some cases partial lists of candidate phrases are inevitable because the category terms are inexactly defined. In other cases partial results can also occur in some variations of the algorithm that are built for speed; these variations include steps that greatly speed up the production of results, at the cost of throwing out some fraction of correct candidate phrases. In cases where performance is critical, these variations may be preferred, even though they produce a less complete list of candidate phrases.

In broad terms, one aspect of the invention works in two major modes (External Ranking mode and the Internal Ranking mode). During the External Ranking mode, an embodiment finds candidate phrases that are likely to satisfy the search type selection (for example, as brands or breeds) in the specified category term space (such as a product or species of animal) judging by information on the entire web or over the entire distributed source of data. It is a "Ranking" because it orders the candidate phrases. It is "External" because each candidate phrases is rated largely on information from web pages that are external to web sites owned by or expressly about the candidate phrase (for example, owned by Xerox corporation or expressly about German Shepherds). As an analogy, we might rate a person's capabilities by asking other people, "what do you think of Joe?" Here, in the brand case, we are asking other web pages, in essence, "Do you think phrase X represents a brand of Y?"

The internal ranking mode then evaluates the candidate phrases based on web pages that are internal to web sites (or data sources) sites owned by or expressly about the candidate phrase by determining how much the category term is referenced by web pages at the site. For the internal ranking mode, we are asking a particular web site of X, "do you make (or at least contain lots of references to) Ys?"

This patent references a number of different brand names (trademarks) and company names in both the description of search terms and results. The following trademarks belong to their respective companies: Bernina®, Sony®, Panasonic®, Toshiba®, Postscript®, PCL®, CNBC®, Hoover's®, Quicken®, Google®, Altavista®, Acrobat®, and Microsoft®.

Looking now to details of one embodiment of the invention.

FIG. 1 illustrates a networked computer system 100 that can incorporate the invention. The networked computer system 100 includes a computer 101 that can include a CPU 103, a memory 105, and an I/O interface 107. The I/O interface 107 provides the computer 101 with access to a network 109. The I/O interface 107 can also provide the computer 101 with access to a removable data device 111. The removable data device 111 can read a computer usable data carrier 113 that typically contains a computer program product 115. The computer program product 115 embodied within the computer usable data carrier 113 is generally read into the memory 105 as a program 119. The network 109 provides access to a network search engine 121 (for example but without restriction, the Google® search engine or the Altavista® search engine).

The computer program product 115 can be provided from the computer usable data carrier 113 such as the network 109 or from other data media. The computer usable data carrier 113 can include, for example, rotating media such as hard, floppy, compact, or DVD disks and the like as well as memory storage such as flash memory devices or any other means of storing program code that can be accessed by the networked computer system 100 either directly or over the network 109. The computer program product 115 includes computer-readable instructions for causing a computer to perform a series of programmed steps (a method).

Figure 2:
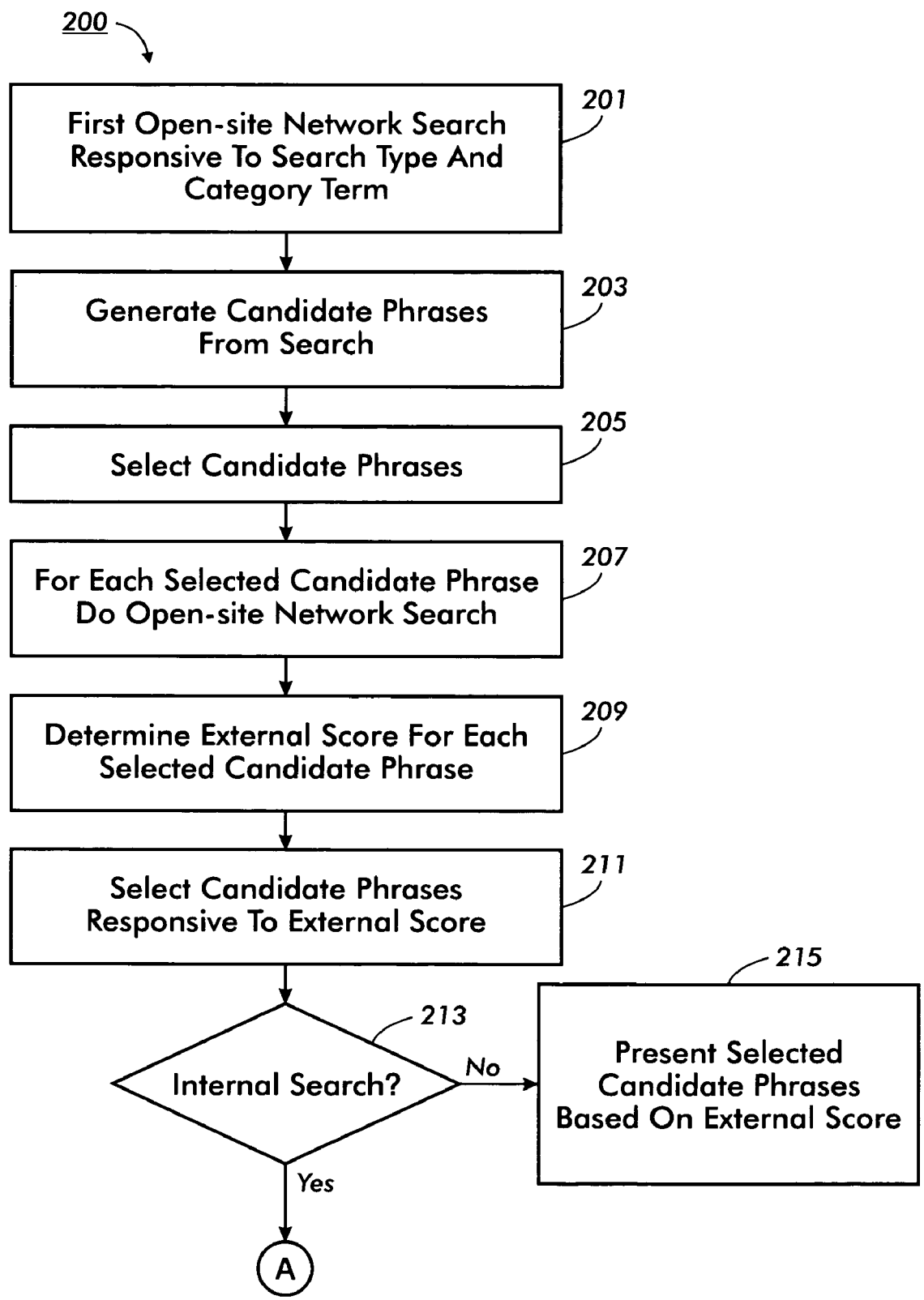
FIG. 2 illustrates a first mode of a classification search process.
Figure 3:
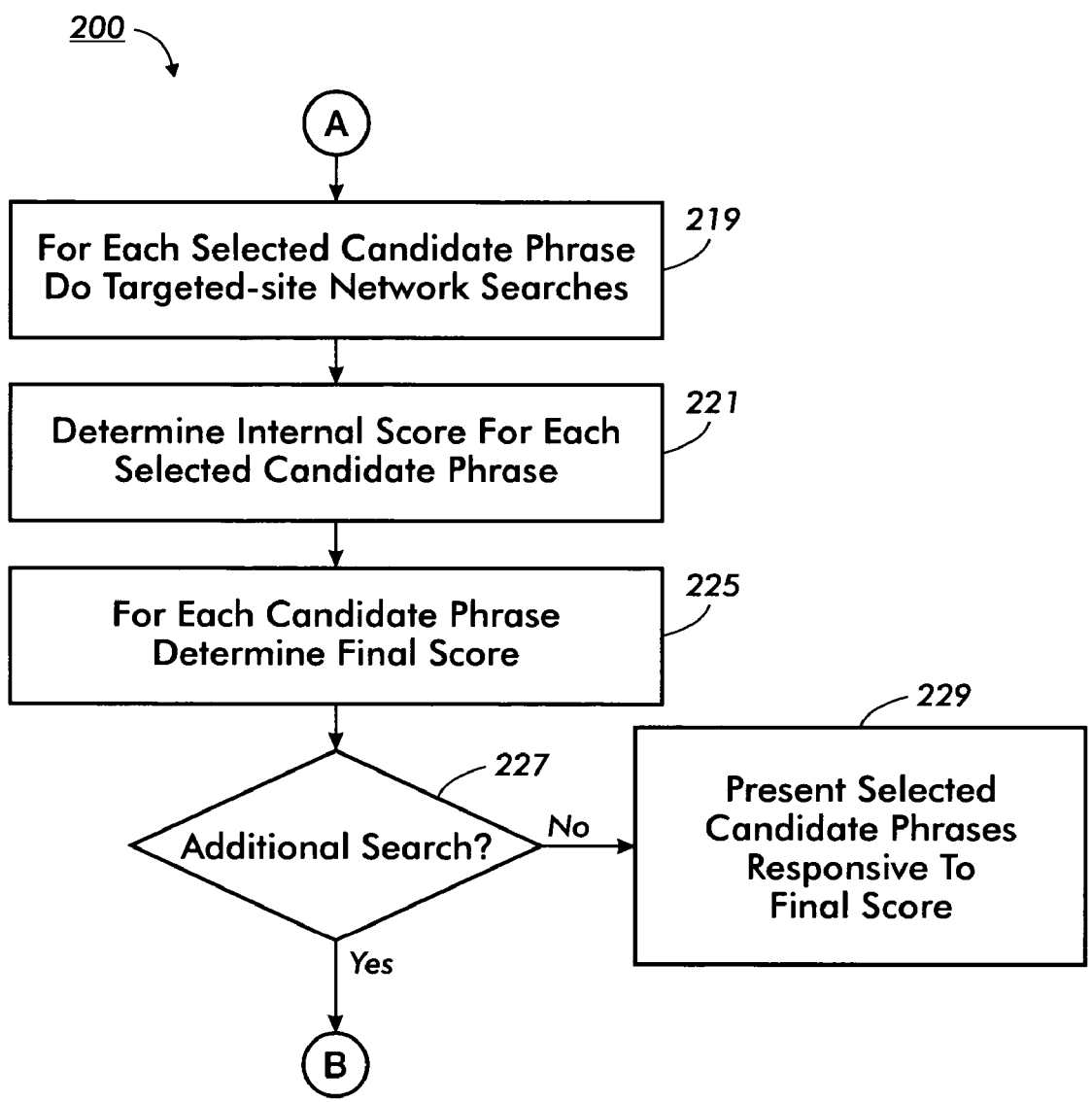
FIG. 3 illustrates a second mode of a classification search process.

FIG. 2 and FIG. 3 provide an overview of one embodiment of the invention. Subsequent figures provide additional detail that is sufficient to allow one skilled in the art to practice one embodiment of the invention without undue experimentation.

Aspects of the invention are described using procedures. A procedure is a self-consistent sequence of computerized steps that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs the steps.

In the subsequent description, the term "files" and "documents" are used interchangeably. One skilled in the art will understand that documents can consist of one or more files and include files containing e-mail, data, databases, as well as a collection of files. Although much of the subsequent description is related to using Internet search engines, one skilled in the art will understand that the inventive aspects of described herein can also be applied to other massive databases and document storage systems.

FIG. 2 illustrates the first mode of a classification search process 200 that can be used to extract candidate phrases (for example product brands or animal breeds) using linguistic facts from a collection of information sources on the network 109 (for example, web pages on the Internet). The classification search process 200 starts at an 'initial search type selection and category term search' procedure 201 that acquires the initial parameters used by the rest of the process. The 'initial search type selection and category term search' procedure 201 returns an initial page set that will be used to generate a list of candidate phrases. The 'initial search type selection and category term search' procedure 201 is subsequently described with reference to FIG. 4.

Figure 4:
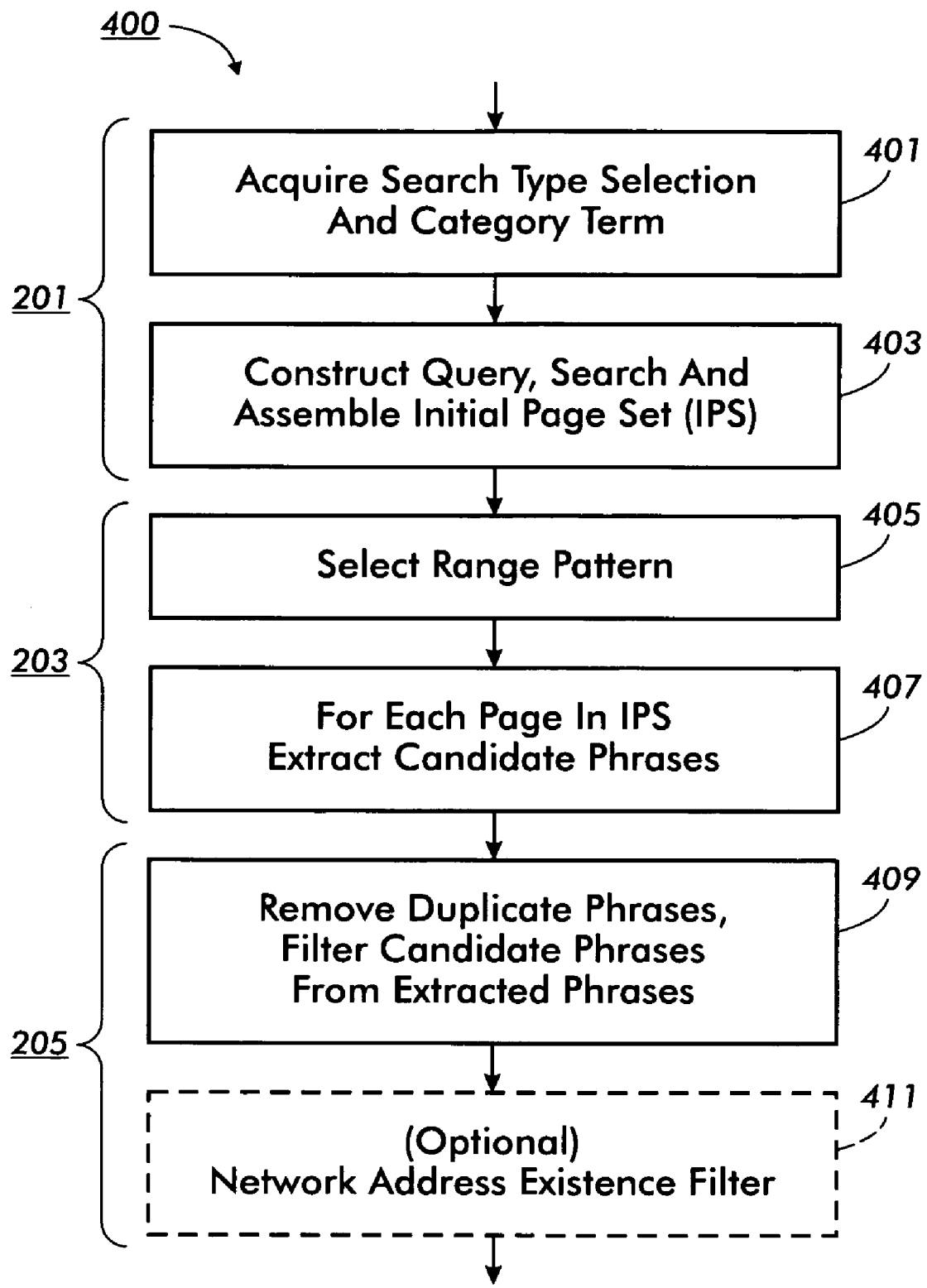
FIG. 4 illustrates expanded processes detailing portions of the process of FIG. 2.

Once the initial page set is determined, a 'generate candidate phrases' procedure 203 determines candidate phrases based on the linguistic fact as is also described with respect to FIG. 4.

Next a 'select candidate phrases' procedure 205 consolidates and/or filters the candidate phrases to limit the number of candidate phrases used in an 'open-site search for each selected candidate phrase' procedure 207. The 'select candidate phrases' procedure 205 is also subsequently described with respect to FIG. 4.

The 'open-site search for each selected candidate phrase' procedure 207 performs an open-site search for each selected candidate phrase to obtain the number of web pages that exist on the network that could contain the candidate phrase. The 'open-site search for each selected candidate phrase' procedure 207 is subsequently described with respect to FIG. 5.

At this point, the list of candidate phrases generally includes some of the phrases-of-interest as well as a number of uninteresting phrases that are not of interest.

A 'determine external score' procedure 209 determines the external score for each of the searched-for candidate phrases as is subsequently described with respect to FIG. 5. The candidate phrases are then selected based on the external score at a 'select candidate phrases responsive to external score' procedure 211. At this point, many of the uninteresting phrases have been removed.

An 'internal search' decision procedure 213 determines whether additional refinement of the list of candidate phrases is desired. If not, the classification search process 200 continues to a 'present candidate phrases responsive to the external score' procedure 215 that makes the selected candidate phrases available to a person or process that invoked the classification search process 200. The term "Presenting" as used by the inventors includes the meaning of presenting the candidate phrases (or information related to a candidate phrase) to a viewer on a display, presenting the information using audio, presenting the information by storing the information into a file for later retrieval, etc., and explicitly includes passing the information to a subroutine, thread, task, or computer for subsequent processing.

If the 'internal search' decision procedure 213 determines that an internal search is desired the classification search process 200 continues to a 'continuation' terminal and the classification search process 200 continues to a second mode as shown on FIG. 3.

The parameters acquired by the 'initial search type selection and category term search' procedure 201 can be supplied by a user, a data file, a procedure call, or other well known data specification technique.

FIG. 3 illustrates the second mode of the classification search process 200 starting from the point of the 'continuation' terminal.

Even though candidate phrases with external scores are useful, additional accuracy can be obtained by performing searches for the category term on targeted-sites. A 'targeted-site search for category term' procedure 219 determines likely network sites that are expected to be associated with the candidate phrase and then searches these network sites for the category term This is done for each selected candidate phrase. Thus, for example, if the candidate phrase was "Sony" and the category term was "DVD Players", the 'targeted-site search for category term' procedure 219 can locate SONY-related web sites and search each of those web sites for "DVD Players". The 'targeted-site search for category term' procedure 219 is subsequently described with respect to FIG. 6.

A determine internal score for selected candidate phrases' procedure 221 determines an internal score for each candidate phrase and is responsive to information retrieved by the 'targeted-site search for category term' procedure 219. The 'determine internal score for selected candidate phrases' procedure 221 is subsequently described with respect to FIG. 6.

A 'determine final score for each candidate phrase' procedure 225 then determines a final score by combining the internal score and the external score for each candidate phrase. This determination can be calculated using weighting factors on the external score and internal score that can be specifically set or automatically determined from the results of the searches.

An 'additional search' decision procedure 227 then determines whether the selected candidate phrases are to be presented. If they are to be presented, the classification search process 200 continues to a 'present selected candidate phrases responsive to the final score' procedure 229 that presents the selected candidate phrases in a similar manner as has been previously described with respect to the 'present candidate phrases responsive to the external score' procedure 215.

At this point, (as will be subsequently seen) some of the candidate phrase terms may be omitted from the list as a consequence of filtering that, in general, improves the results. However, if the 'additional search' decision procedure 227 determines that additional accuracy is desired the classification search process 200 continues to a 'continuation' terminal for additional processing to recover some of the missing candidate phrases. This additional processing is subsequently described with respect to FIG. 7.

FIG. 4 illustrates expanded processes 400 and provides additional details about the 'initial search type selection and category term search' procedure 201, the 'generate candidate phrases' procedure 203, and the 'select candidate phrases' procedure 205.

An 'acquire search type selection and category term' procedure 401 acquires information from a user or program that specifies a search type selection and category term. Thus, a user may be asked to specify the search type selection and category term information (for example, the "brand" of "DVR player"). Another example specification could be a "breed" of "dog". A user can also specify which network search engine to use (or combination of network engines to use). If no search engine is specified, a default or preference specified search engine is used.

One skilled in the art will understand that the acquisition of this information can be done through a web page, through a specialized user interface, by a remote procedure call to a server that implements the invention, or in any of many other ways well known in the art.

Once the search type selection and category term information is acquired from the user a 'construct query, search, and assemble initial page set' procedure 403 computes a first query that will be used with a first open-site network search that searches for network pages that include the category term used in a way consistent with the search type selection. The input can be used to specify or select particular options for the first query that are relevant for the specified search type selection. For example, if the search type selection was specified as "brands" the first query can include terms such as "brands" or "manufacturers".

The first query is dependent on the search engine used. For example, using the Google® search engine circa 2004 and a search type selection of "brand" and category term of "DVD player" the 'construct query, search, and assemble initial page set' procedure 403 automatically constructs a query similar to:

"DVD player OR players" brands OR manufacturers

If using the AltaVista® search engine of the same time, the 'construct query, search, and assemble initial page set' procedure 403 automatically constructs a query similar to:

("DVD player" OR "DVD players") AND (brands OR manufacturers)

Another example would be for a search type selection of "breed" of category term "dogs" that would automatically construct the following queries for the Google® search engine and the AltaVista® search engine respectively:

"dog" breed OR breeds ("dog") AND (breed OR breeds)

In some embodiments, a user has the option to edit the automatically generated query prior to the submission to the search engine. Regardless the query is submitted to the search engine.

The selected search engine returns information (for example, an HTML page) containing the first search result. The data in the first search result is used to assemble the initial page set that will be used in subsequent steps. For larger knowledge spaces, the inventors have found that the above searches often need not include the plural of the category term. However, inclusion of the plural for smaller knowledge spaces increases the number and quality of the initial page set.

In some embodiments that present a dialog interface to a user, the "search type selection" selection is made by selecting a pull down option, while a free text input field is used to capture the category term.

Some embodiments can use multiple search engines (for example, both the Google® and AltaVista® search engines).

The search result information returned from the search engine(s) can be a web page, or data following the XML, SOAP, or other format. Once the search result information is returned, the initial page set is assembled by extracting the URLs of some number of the top-ranked entries returned in the first search result and examining information about the returned URLs to determine which of the URLs can be discarded. For example, some of these URLs may be discarded if the file they point to are not compatible with the information extraction tools (for example, one embodiment simply ignores pages that are not in HTML format while other embodiments can analyze HTML files as well as ASCII text files, Postscript files, Acrobat® files, Microsoft® word files, etc.). Once the URLs are discarded based on information provided by the search engine with the URL, the remaining URLs can be used, if needed, to download the files to determine whether they meet other parameters. For the remainder of this document we will discuss the techniques using HTML files. One skilled in the art will understand that the same or substantially similar techniques that are disclosed with respect to HTML files can be used with the other file formats.

Some search engines provide two URLs for each entry. These are the URL to the live page and the URL to a copy of the page cached by the search engine. The use of either of these URLs produce satisfactory results.

If needed, the pages belonging to the initial page set can be downloaded using techniques well known to one skilled in the art.

The pages belonging to the initial page set are filtered to keep pages that are likely to mention a "candidate phrase" related to the specified category term (for example, pages that are likely to mention the brand of a DVD player). Thus, the downloaded pages can be classified as "OK", as "too short", as "too long", or from a previously-seen web site ("previously seen"). If not enough pages are classified as "OK" (one embodiment currently strives to achieve 20 pages), then additional pages can be downloaded using URLs from the first search result. If all URLs from the first search result have been downloaded and there are still too few pages classified as "OK", then we can classify some or all of the "too long" pages as "OK" pages. If there are still insufficient pages classified as "OK", then we can reclassify some or all of the "previously seen" as "OK". If we still do not have enough pages, we can request a new search from the search engine with an increased number of returned links. This can be repeated until the maximum limit supported by the search engine is reached or some upper limit is reached. One embodiment uses the following progression: 30, 60, 125, 250, 500, and 1000. If after the maximum, there are still less than the desired "OK" pages, one embodiment continues with whatever number of "OK" pages it has. One skilled in the art will understand that because search results are often segmented into multiple pages, that to obtain the URLs from the larger search sets, additional page selection may be required to select the segmented pages. Such a one will also understand that there are many other ways to obtain sufficient pages (for example, by submitting additional queries prior to selecting long pages or pages from sites that were previously seen).

The 'acquire search type selection and category term' procedure 401 and the 'construct query, search, and assemble initial page set' procedure 403 correspond to the 'initial search type selection and category term search' procedure 201.

At this point, we generally have enough usable pages. The next step is to extract candidate phrases from these pages. This is accomplished by first locating phrases that match a linguistic fact related to the search type selection and category term based only on the syntax of the phrase. A 'select range pattern' procedure 405 determines from the search type selection input what Range Pattern to use.

For example, if the search type selection specified a search for product brands, we recognize that most brands have each word in the brand capitalized; that it is rare for a brand name to have more than five capital letters; rare to have characters that are not letters nor digits; seldom has more than two digits; generally do not have more than one period; rarely have more than one apostrophe; and that punctuation characters are generally not part of a brand; and that symbols such as ".–'*" while acceptable in the middle of a brand, will not be the first or last character of the brand name.

These conditions can be defined by a set of equations we call a range pattern. In one embodiment, the range pattern for detecting each word in a brand can be defined as:

$$1 \leq \text{capitals} \leq 5$$
$$1 \leq \text{initial capitals} \leq 1$$
$$0 \leq \text{symbols} \leq 2$$
$$0 \leq \text{digits} \leq 2$$
$$0 \leq \text{periods} \leq 1$$
$$0 \leq \text{apostrophes} \leq 1$$
$$\text{Separators} = < > (\ )\ [\ ]\ \{\ \}\ ,\ ;\ :\ ?\ =\ "$$
$$\text{Start\_separators} = \text{`} \ .\ -\ *$$
$$\text{End\_separators} = \text{'} \ .\ -\ *$$

In one embodiment, the range pattern for detecting each word in a breed can be defined as:

```
1 ≤ capitals ≤ 1
1 ≤ initial capitals ≤ 1
0 ≤ symbols ≤ 0
0 ≤ digits ≤ 0
0 ≤ periods ≤ 0
0 ≤ apostrophes ≤ 0
Separators = < > ( ) [ ] { } , ; : ? = "
Start_separators = ' . - *
End_separators = ' . - *
```

The first portion (first 6 rows) of the range pattern define a numerical range for character counts that must be satisfied. The last three lines define separators. The characters specified by Separators must not occur inside of the word of a candidate phrase. Further, separators cannot occur between consecutive words of a candidate phrase. Separators are used to separate the candidate phrase from any adjacent phrases.

A symbol is any character that is not white space, not a letter, and not a digit. Start_separators and End_separators may occur inside a word of a phrase, but not as the start or end character of any word of the phrase.

Note that the range pattern can be overly restrictive but subsequent processing (for example, see FIG. 7 and its description) can pick-up many candidate phrases that are initially rejected by the range pattern.

Thus, depending on the provided search type selection, the appropriate range pattern is selected. One skilled in the art will understand that the range patterns described above are but one way to define the linguistic facts of interest to identify candidate phrases related to a category term. Such a one will also understand that linguistic facts of interest can also apply classifications other than brands or breeds.

An 'extract phrases for each page in initial page set' procedure 407 applies the selected range pattern to the content of each of the pages in the initial page set to extract the candidate phrases for the category term. The following will discuss processing for HTML pages. Pages in other formats can be processed in a similar manner.

One initial assumption is that the candidate phrase terms will not include HTML tags inside the term. Based on that assumption we remove all HTML tags from the page. This results in a set of plain text strings we call Plain Text Strings.

For each of the Plain Text Strings, we split each string at white space characters and at any characters contained in the "Separators" list of the range pattern. This results in string fragments of the Plain Text Strings that we call Words.

We now consider the Words in a left to right order. For each Word, we mark whether or not the Word passes the range pattern.

Once all of the Words in a Plain Text String are marked, we form intermediate phrases from the Words. This is accomplished by combining adjacent Words that passed the range pattern test. Words that have failed the range pattern test serve as separators between phrases. For example, if we have 10 Words in a Plain Text Strings and Words 1, 3, 4, 7, 8 and 9 pass the range pattern test, then we will have three intermediate phrases {1}, {3,4}, and {7,8,9}. Next, from the beginning of each intermediate phrase, we remove any characters listed in the "start_separators" list and from the end of each of the intermediate phrases we remove any characters listed in the "end_separators" list. This results in phrases we call Maximum Length Range Pattern Phrases and which are a non-optimized list of candidate phrases.

For each of the Maximum Length Range Pattern Phrases we remember which page or pages include the Maximum Length Range Pattern Phrase.

At this point, there can be a large number of Maximum Length Range Pattern Phrases. We can optionally reduce the number of these phrases by applying a Phrase Size Pruning algorithm and/or an English Word Pruning algorithm. The Phrase Size pruning algorithm can be optionally applied so that only single Word capitalized phrases are kept. In some cases this greatly reduces the number of incorrect phrases with only a small reduction in the number of correct phrases.

The idea behind the English Word Pruning algorithm is to remove natural language words that are not special to the domain. For example, if searching for brands, the algorithm can search a dictionary of the appropriate language, and if the term is not marked as a trademark or a proper noun, but exists in the dictionary, it can be discarded. We can either discard the phrase dependent on whether the phrase contains all natural language words (Light Word Pruning) or whether any word in the phrase is a natural language word (Heavy Word Pruning).

Pruning is important at this point because it limits the number of subsequent searches that are required by the subsequent processing and thus improves performance. Again, additional processing can recover candidate phrases that are filtered out by these optimizations.

The 'construct query, search, and assemble initial page set' procedure 403 and the 'select range pattern' procedure 405 correspond to the 'generate candidate phrases' procedure 203.

Once the Maximum Length Range Pattern Phrases have been extracted from the web pages belonging to the initial page set, a 'filter candidate phrases from extracted phrases' procedure 409 combines the Maximum Length Range Pattern Phrases into a single list and removes duplicates. This results in an optimized list of candidate phrases. Each candidate phrase is also marked with the number of pages from the initial page set that the candidate phrase exists within. The count of the numbers of pages in the initial page set that mention a given candidate phrase can be used as an additional score or ranking.

A 'filter candidate phrases for network site existence' 411 is an optional filter for reducing the number of candidate phrases. This filter is based on the assumption that if the given candidate phrase is in fact the name of a brand, a breed, or other search type selection (for example, if a brand of the category term exists), then there is likely to be a web site that includes candidate phrase in its name. Thus if a candidate phrase is "X" then there is likely to be a web site similar to "X.com", "X.org" or with a "www" prefix. Thus, if a candidate phrase does not have a corresponding web site that candidate phrase can be filtered out.

The 'filter candidate phrases from extracted phrases' procedure 409 and the 'filter candidate phrases for network site existence' 411 correspond to the 'select candidate phrases' procedure 205.

At this point, we have a list of candidate phrases without duplicates and for which there is optionally an associated web site (or other data source). The next step is to gather information about each candidate phrase to determine whether the phrase is likely to be-of-interest (for example, whether the candidate phrase is a brand) and to develop an external score for the candidate phrase.

Figure 5:
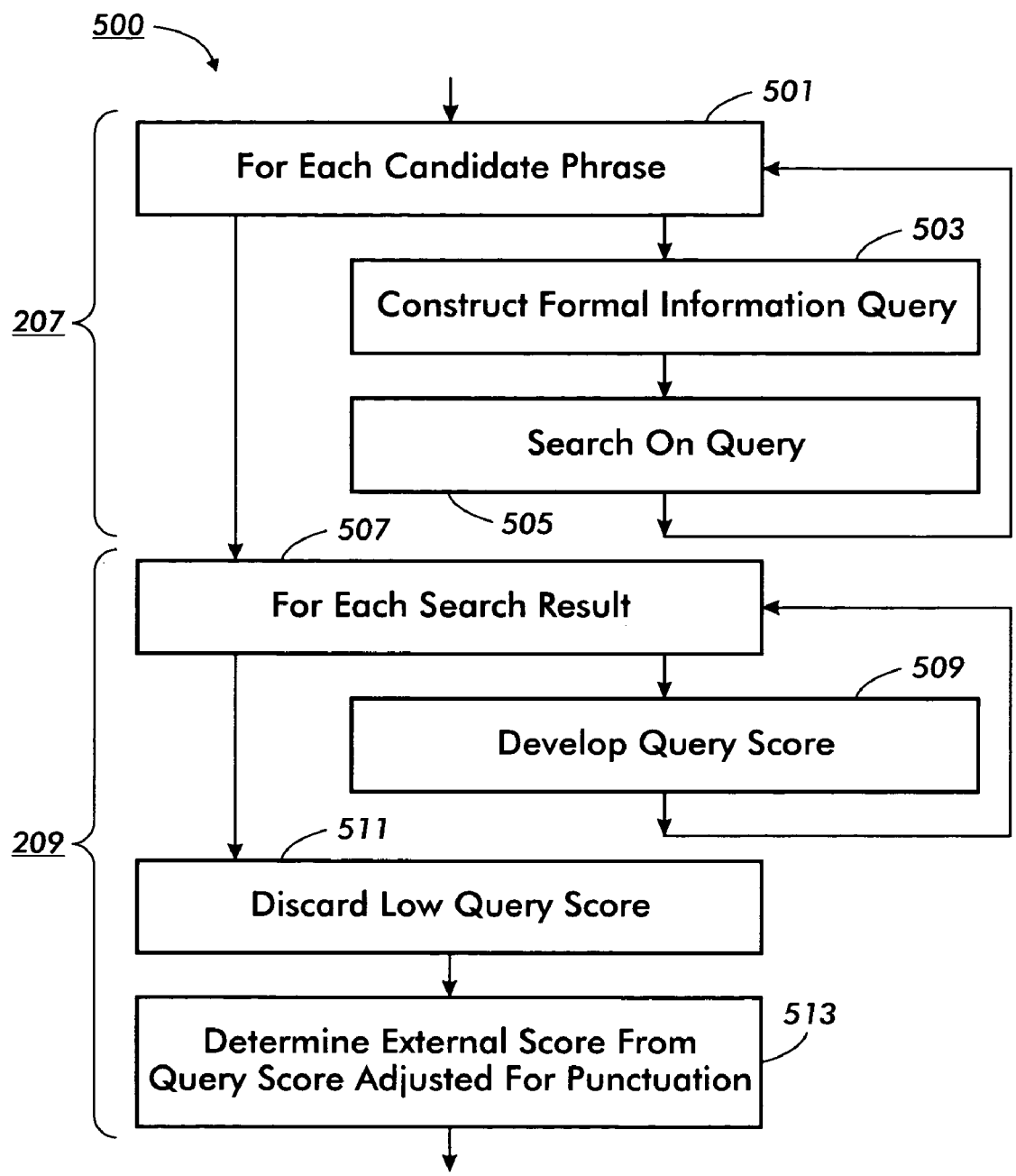
FIG. 5 illustrates additional expanded processes detailing portions of the process of FIG. 2.

FIG. 5 illustrates expanded processes 500 that provides additional details about the 'open-site search for each selected candidate phrase' procedure 207 and the 'determine external score' procedure 209 that are used to develop an external score for the candidate phrases.

A 'for each candidate phrase' procedure 501 iterates over the candidate phrases returned by the 'select candidate phrases' procedure 205. At each iteration, a 'construct formal information query' procedure 503 constructs a search query generally consisting of the candidate phrase and the supplied category term. Thus, if the category term is "DVD player" and the candidate phrase is "Hitachi" the query for the Google® search engine could be:

"Hitachi DVD player"

At this point a number of strings can be made available that have been developed from the previous procedures. These include the following strings:

1. List—type: for example, "brand", "breed" or some other classification.
2. Category: for example a "DVD Player" or animal species.
3. Category-plural: plural of the Category.
4. Candidate: each potential candidate phrase (for example a brand name or breed name).
5. Candidate-for-google: Google specific search string including "+" markers to consider every word in the candidate phrase.
6. Candidate-as-site: www.X.com or .org A system designer or power-user can use these strings to generate custom queries or to edit automatically created queries and/or the search format for the designer's or user's specific needs. These search formats can be saved for later use or as variants of the List-search type selection.

One successful query formulation for brands is of the form: "Candidate Category" that can result in a search using "Hitachi DVD player". A successful query formulation for breeds is: "Candidate CategoryOR List-type" that can result in a search using "Airedale dog OR breed". In addition, additional keywords, chosen to go with the search type selection, can be added to the query. Thus, for search type selection of "brand", the keyword "manufacturers" can be included in the query.

Once the formal information query (first mode query) is constructed for one of the candidate phrases it is submitted to the search engine by a 'search on query' procedure 505 to perform a second open-site network search. This is repeated for each candidate phrase iterated by the 'for each candidate phrase' procedure 501.

The 'open-site search for each selected candidate phrase' procedure 207 corresponds to the 'for each candidate phrase' procedure 501, the 'construct formal information query' procedure 503, and the 'search on query' procedure 505.

The search engine generates a second search result for each of the searched-for candidate phrases. At some point after receiving one or more of the second search results, a 'for each search result' procedure 507 iterates over each search result and a 'develop query score' procedure 509 extracts the number of pages that were found by the search. The number of pages is used as a query score that is associated with the candidate phrase used to generate the first mode query.

Once all the search results are processed by the 'develop query score' procedure 509 the results can be optionally normalized (not shown) to compensate for the situation where a natural language word is more likely to appear immediately before the category term (such as a generic name of a product). For example, "The" and "Black" are common English words; thus, if we received data that 1,000 pages mentioned "The DVD player", another 1,000 pages mentioned "Black DVD player", and still another 1,000 players mention "Sony DVD player", this would be stronger evidence that Sony is a brand than that "The" or "Black" are brands, because Sony is less common in the language as a whole.

Although the candidate phrase list at this point contains interesting (useful) information, it also contains uninteresting information. The quality of the contents of the candidate phrase list can be improved by a 'discard low query score' procedure 511 that discards any candidate phrase from list that has a low query score (for example, discarding candidate phrases for which no pages were found by the search).

A 'determine external score from query score' procedure 513 then determines an external score for each of the remaining candidate phrases in the list after adjusting the query score for punctuation. This adjustment is useful because search engines generally ignore punctuation. Thus, for example, a query for "wakeboarding wetsuits" will count pages with "Wakeboarding, Wetsuits" and "Wakeboarding: Wetsuits". Neither of these phrases is of the form "Search type selection Category term" and thus can be discarded.

In one embodiment, each returned link is used to download the associated page and that page is examined for the candidate phrase to make the adjustment. In a second embodiment, we sample only some of the pages to determine an adjustment coefficient $\alpha$. The adjustment coefficient can be determined by downloading and analyzing a sample of the pages that contain the candidate phrase. In addition, we can develop the adjustment coefficient from summary information (returned by the search engine) that includes the searched-for terms.

Each summary or downloaded page (or combination) is first examined to see whether it contains the candidate phrase followed by the category term. The number of summaries or downloaded pages that contain the candidate phrase followed by the category term is g (for good). The number of summaries or downloaded pages that contain the candidate phrase in close proximity to the category term but separated by punctuation is b (for bad). We ignore the number of summaries or downloaded pages where the words of the candidate phrase and the category term are not in close proximity, or if we are unable to access enough of the page or summary to determine if they are in close proximity. Then $a=g/(g+b)$ which is the ratio of the pages that have positive evidence to the number of pages that have any evidence at all. Once a is determined, we can determine the external score as: es=a*query score.

The 'determine external score' procedure 209 corresponds to the 'for each search result' procedure 507, the 'develop query score' procedure 509, the 'discard low query score' procedure 511 and the 'determine external score from query score' procedure 513.

In the 'select candidate phrases responsive to external score' procedure 211, we discard candidate phrases that have a low external score.

At this point we have completed the external ranking of the candidate phrases. As a result, the candidate phrase list contains many interesting phrases, but the list probably still has a significant number of uninteresting phrases. The candidate phrase list can be improved by determining the internal ranking for each candidate phrase.

Figure 6:
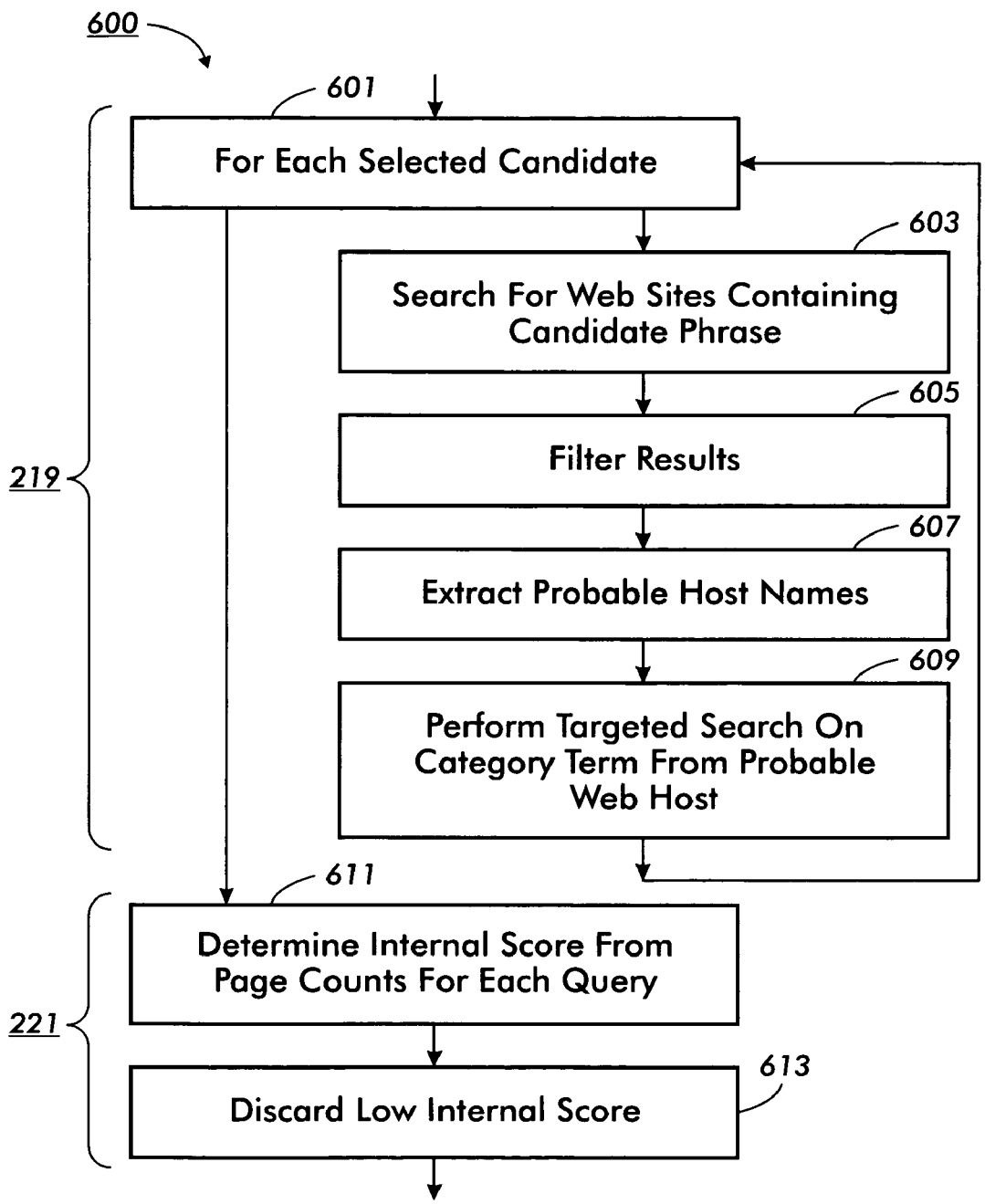
FIG. 6 illustrates expanded processes detailing portions of the process of FIG. 3.

FIG. 6 illustrates expanded processes 600 that correspond to the 'targeted-site search for category term' procedure 219 and the 'determine internal score for selected candidate phrases' procedure 221. These processes can be used to refine the results from the external ranking process previously described. This refinement results from making the assumption that there exist data sources (for example, web sites) that use the candidate phrase as part of the data source identification (for example, by using the candidate phrase as part of the web site name); and that these data sources provide access to documents that contain the category term (a likely assumption for both breeds, brands, and other phrases that match particular linguistic facts). We can obtain additional information from these data sources if they exist. The goal of the internal ranking process is to determine how much information about the category term is present in such web sites. This is done, for the Internet embodiment, by determining a web host that contains some or all of the candidate phrase in the name of the web site. Thus if a candidate phrase is "X" then we are interested in finding a web site having an address similar to "X.com", "X.org" or with a "www" prefix that have files that containing the category term.

The expanded processes 600 include an 'iterate candidate phrases' procedure 601 that iterates each of the candidate phrases that resulted from the 'determine external score' procedure 209. On each iteration we attempt to find probable web hosts for the iterated candidate phrase. This is accomplished by a 'search for web sites containing candidate phrase' procedure 603, that constructs a site query using the candidate phrase and searches for all web sites that contain the candidate phrase in the site address and/or site name. This search can include a domain limitation (thus, when searching for brands in the United States, the domain limitation would generally be ".com" or its variants, and for breeds generally ".org"). Thus if the candidate phrase was "SONY", a search using Google's search engine could be:

"% SONY"

or:

"SONY" site:com

If using AltaVista's search engine:

"SONY"

or

"SONY" domain: corn

The search result provides a list of URLs that satisfy the search. The site identification can be extracted from the returned URLs. Once the search result is returned, a 'filter results' procedure 605 discards any URLs that do not contain the candidate phrase in the site address and/or site name.

Next an 'extract probable web host name' procedure 607 extracts the host name from each of the remaining returned URLs into a list (removing any duplicates). Thus, this list contains the probable web hosts for the candidate phrase.

A 'perform targeted search' procedure 609 then constructs a second mode query and submits at least one targeted-site network search for the category term on each of the probable web hosts. For example, assuming the candidate phrase to be "SONY" and further assuming that www.sonymusic.com and www.sony.xyzzy.com exist and that they are both one of the top search engine hits, and the category term to be "DVD player" we would submit a search for the category term targeted to the probable web hosts. For Google's search engine, the second mode query could be:

"DVD player OR players" site:www.Sony.com or (for example to target additional sites):

"DVD player OR players" site:www.sony.com OR site:www.sonymusic.com OR site:www.sony.xyzzy.com and for AltaVista's search engine, the second mode query could be:

("DVD player" OR "DVD players") AND host:www.sony.com or (for example):

("DVD player" OR "DVD players") AND (host:www.sony.com OR host:www.sonymusic.com OR host:www.sony.xyzzy.com)

One skilled in the art may be tempted to try a search similar to "SONY" "DVD player" site: com. However, the inventor has discovered that this type of query generally causes the search engine to return a higher percentage of sites owned by distributors of the product rather than sites owned by the manufacturer of the product.

The 'targeted-site search for category term' procedure 219 corresponds to the 'for each candidate phrase' procedure 501, the 'construct formal information query' procedure 503, the 'search on query' procedure 505, the 'for each search result' procedure 507, and the 'develop query score' procedure 509.

Once the 'iterate candidate phrases' procedure 601 completes, we have a list of probable web hosts that contain documents that include the category term and we also have the results (the third search results) from the targeted searches.

A 'determine internal score' procedure 611 examines the third search results and develops an internal score that can be the number of pages returned by each query (if multiple sites were searched, the number of pages found at each site are added together).

Next, a 'discard low internal score candidates' procedure 613 discards candidate phrases that have an internal score less than or equal to a chosen threshold (such as zero). The 'determine internal score for selected candidate phrases' procedure 221 corresponds to the 'determine internal score' procedure 611 and the 'discard low internal score candidates' procedure 613.

As previously discussed the 'determine final score for each candidate phrase' procedure 225 combines the internal score and the external score to determine the final score and the 'present selected candidate phrases responsive to the final score' procedure 229 presents the resultant selection (see the previous discussion about "presenting").

Presenting the results can be done in any number of different ways including having the results written to a file, returned to a subroutine or by being presented in a table such as Table 1 (resulting from a search for a brand of DVD player). Table 1 can be generated by presenting information gathered from several parts of the technology disclosed

TABLE 1

| Brand/Kind of DVD player | Pages in related web sites |
|---|---|
| Panasonic | DVD player pages in www.panasonic.com (192 pages) |
| | 5210 other pages about Panasonic DVD player |
| Sony | DVD player pages in www.sel.sony.com (108 pages) |
| | DVD player pages in www.sonymusic.com (15 pages) |
| | DVD player pages in 7 other sony sites |
| | 6940 other pages about Sony DVD player |
| Toshiba | DVD player pages in www.Toshiba.com (232 pages) |
| | DVD player pages in 3 other Toshiba sites |
| | 4860 other pages about Toshiba DVD player |
| Pages that mention multiple brands of DVD player | |
| www.hifiheaven.com/dvd-players.htm | |
| www.phone-soft.com/cyber-world/o209li.htm | | herein. In Table 1, the first type of information in the Panasonic, Sony, and Toshiba sections summarize the number of pages containing the category term found at sites generated during the internal score determination and provides a link to a computed page that contains links to the found pages. The second type of information provides a link to a computed page that contains links found during the generation of the external score. The final section of Table 1 provides some of the top-ranked pages from the subsequently described list expansion process.

Thus, when searching for brands the user can see which brands have been found, is provided with hyperlinks to manufacturer's sites that have pages about the category term (DVD Player), is provided with other non manufacturer sites that reference the brand of DVD player, and is provided with pages that have multiple brands of DVD players.

One skilled in the art will understand that not all possible candidate phrases will be found using only this aspect of the invention. In particular, phrases filtered out by the Phrase size pruning and/or English word pruning filters will not be presented. As a result, for example, if looking for brands of sewing machines, this aspect of the invention would filter out terms like "singer", "brother", etc. because they are English words as well as brand names. Thus, the candidate phrase list from the above can be presented for additional analysis to recover incorrectly filtered or omitted candidate phrases through the 'continuation' terminal to a list expansion process.

The list expansion process aspect of the invention is directed to finding additional elements of a partially enumerated list and/or a partially correct list so that a more complete/correct list can be developed. This aspect of the invention can also be used to recommend documents of interest, to determine additional list elements given an initial list specified by a user or via a user interface, and as input to other automatic information extraction techniques. This aspect of the invention can be used separately, or can be used with the previously described techniques for generating a more correct/complete list of candidate phrases. Thus, if the initial input is an incomplete or incorrect list of candidate phrases the list expansion process can discover other candidate phrases that may have been filtered out by the previously discussed filters, and can add the newly discovered candidate phrases back into the list.

Figure 7:
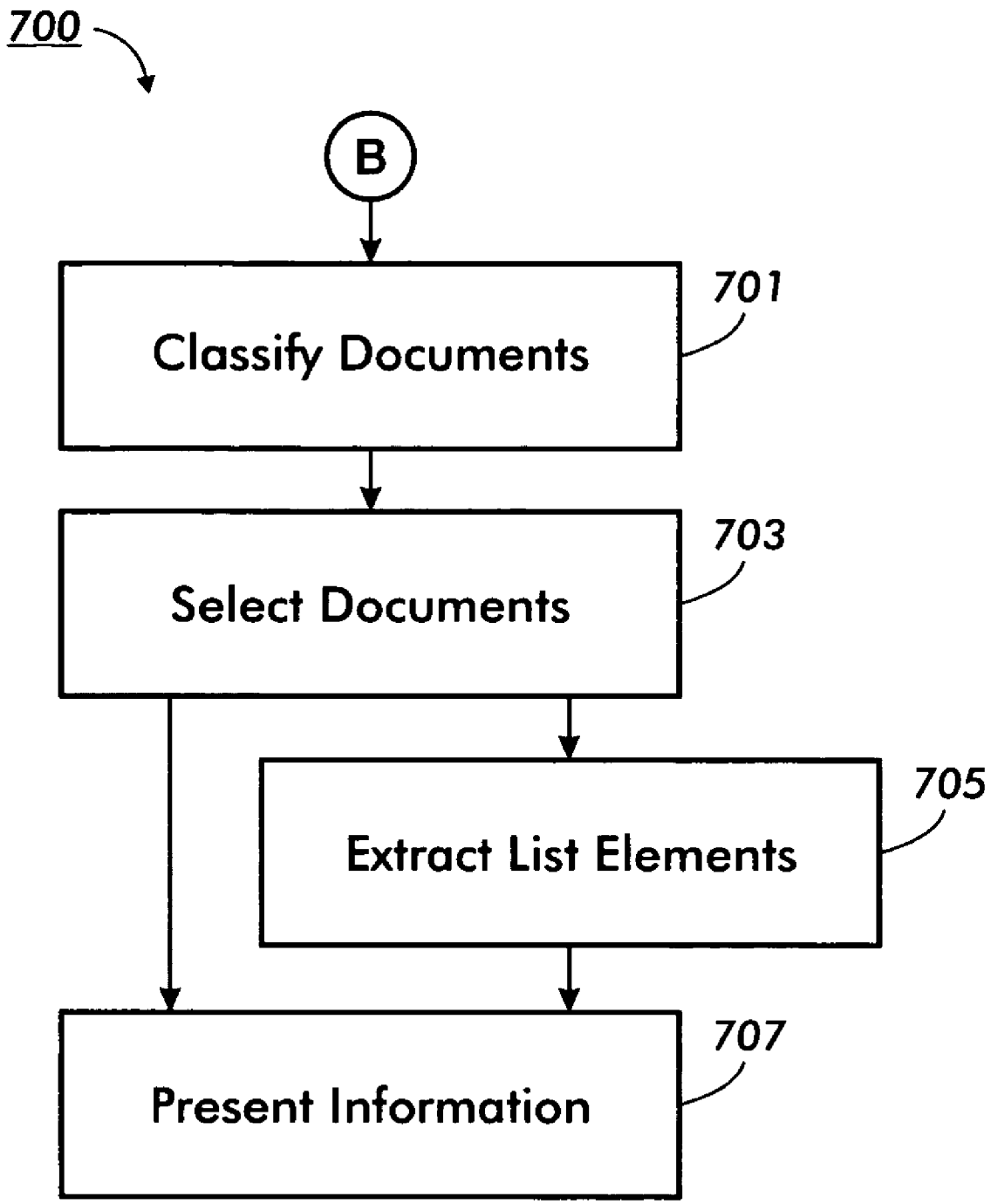
FIG. 7 illustrates a list expansion process.

FIG. 7 illustrates a list expansion process 700 that has as input some number k of initially provided possible list elements and a desired number d of documents. For example, the initially provided possible list elements can be a list of candidate phrases and the list expansion process 700 can be directly invoked through the "B" 'continuation' terminal as well as through a user interface, API, or other mechanism well known in the art (not shown). The list expansion process 700 can locate additional list elements beyond those in the initially provided possible list elements and can also help determine which of the initially provided possible list elements do not belong in the list.

The list expansion process 700 starts at a 'classify documents' procedure 701 that computes a query suffix, and receives search results that indicate the sizes of the document spaces that contain all or some of the k initially provided possible list elements. It does this by searching for sets of documents that contain combinations of the initially provided possible list elements. The 'classify documents' procedure 701 is subsequently described with respect to FIG. 8.

Next, a 'select documents' procedure 703 imposes a ranking on the document spaces returned from the 'classify documents' procedure 701 and downloads selected documents from the ranked document spaces. The 'select documents' procedure 703 is subsequently described with respect to FIG. 9.

At this point, the selected documents can be presented to a user through a 'present information' procedure 707.

After the documents are selected, an 'extract list elements' procedure 705 can examine a selection of the documents to locate human readable lists and extract elements from the lists. The 'extract list elements' procedure 705 is subsequently described with respect to FIG. 10. The extracted list elements can be ordered and ranked using previously described techniques as applied to candidate phrase information. In addition, the extracted list elements can be added to the list of candidate phrases.

The information developed by the 'select documents' procedure 703 and/or the 'extract list elements' procedure 705 can be presented by a 'present information' procedure 707. The 'present information' procedure 707 presents (as has been previously described) the information to a user, to storage for later use by a user or program, as an HTML file, to a subroutine, etc.

Figure 8:
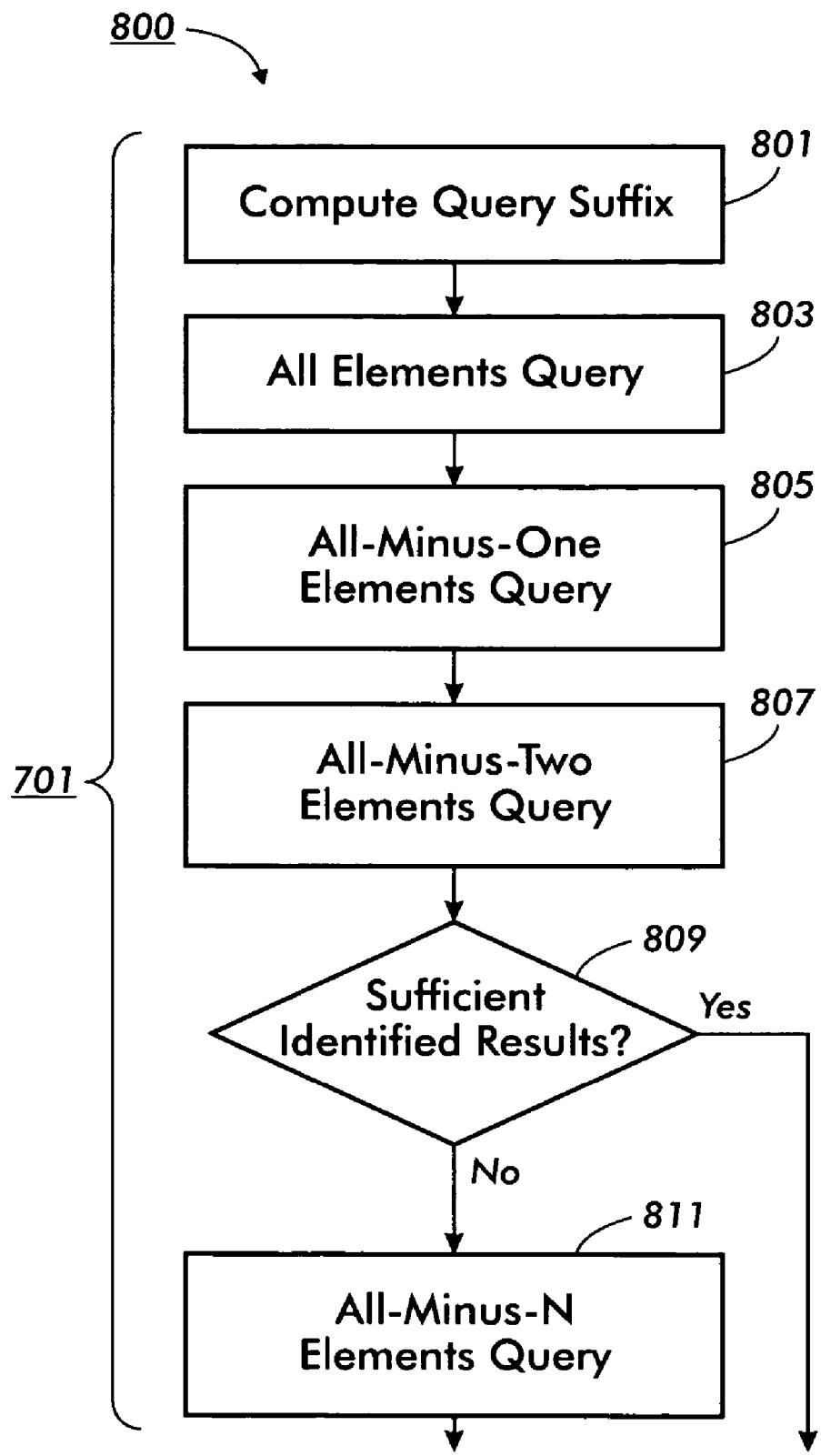
FIG. 8 illustrates a classify document process that can be used in the process shown in FIG. 7.

FIG. 8 illustrates a classify document process 800 that corresponds to the 'classify documents' procedure 701 of FIG. 7 and performs multiple searches to obtain numbers representing the sizes of the document spaces for documents containing different sets of initially provided possible list elements. By comparing the sizes of the document spaces we can obtain evidence about the quality of the initially provided possible list elements.

The classify document process 800 initiates at a 'compute query suffix' procedure 801 that determines a query suffix (a string of key words) that should be included with all of the queries for groups of the initially provided possible list elements performed by the classify document process 800. The query suffix procedure can incorporate a parameter, a preference, terms responsive to the search type selection, terms responsive to the category term, a user input, etc. (for example, "sewing machine" and ("brand" or "manufacturers")). Once the query suffix is determined, an 'all elements query' procedure 803 constructs a first query that will determine the size of the document space for documents that include all K of the initially provided possible list elements and that satisfy the query suffix. The first query is sent to a search engine. From the information returned by the search engine, we extract the number of documents or web pages that match the query and this number represents the size of the document space for documents that contain all K of the initially provided possible list elements. This number is extracted from the search summary information that is provided by the search result page, a API call, XML document or other mechanism to receive search results (for example, the Google search engine circa 2004 provides a summary line similar to "Results 1-20 of about 216,000 pages"). The size of the document space depends on the quality of the initially provided possible list elements (that is, whether the elements should be grouped together, whether there are incorrect list elements in the list, etc). When one of the possible list elements is incorrect, or should not be in the group, it is likely that the size of the document space for documents that include all K of the initially provided possible list elements will be small. In this case, the next steps are useful to find a more correct set of list elements than the initially provided possible list elements.

An 'all-minus-one elements query' procedure 805 is then performed to determine the sizes of the document spaces that have K−1 of the initially provided possible list elements. This set of K queries is the second query set; each individual query specifies all but one of the initially provided possible list elements (thus, each individual query has the same "cardinality" as every other query in the second query set), specifically excludes the omitted list element, and each query is different from other queries in the set. The second query set is sent to the search engine that returns the sizes of the document spaces that include K−1 of the initially provided possible list elements and that satisfy the query suffix.

We have found that smaller document spaces represent stronger evidence that the excluded possible list element belongs in the list while the exclusion of elements that do not belong in the list lead to larger document spaces. For example, we expect a smaller document space in a DVD brand search for All-minus-SONY, if SONY is a popular DVD player brand, than the document space found for a search for All minus ACME where ACME is not a popular DVD player brand (because SONY—a popular brand—is now included in the All-minus-ACME search).

Notice that the document spaces can include documents that have additional list elements beyond those in the initially provided possible list elements. Further notice that these additional list elements can sometimes be used to expand the list beyond the initially provided possible list elements.

Also notice that in the case of the 'all-minus-one elements query' procedure 805 if looking for brands of sewing machines and one of the initially provided possible list elements was not a brand of sewing machine, or had an error (such as a misspelling), the document spaces found using the 'all-minus-one elements query' procedure 805 that have the correct possible list elements will be larger than the document space returned using the 'all elements query' procedure 803. Thus, by comparing the sizes of the document spaces found by the 'all elements query' procedure 803 and the 'all-minus-one elements query' procedure 805 we obtain information about the correctness and/or completeness of the initially provided possible list elements.

Two of the queries from the set of queries formatted for Google (and assuming the following six initially provided possible list elements: gfaff, janomme, elna, ricccar, allbrands, and husqvarnaa) could be:

-gfaff +janomme +elna +ricccar +allbrands +husqvarnaa "sewing machine OR machines"
+gfaff -janomme +elna +ricccar +allbrands +husqvarnaa "sewing machine OR machines"
. . .

An 'all-minus-two elements query' procedure 807 generates a third set of queries that explicitly excludes two of the initially provided possible list elements and returns the sizes of the document spaces that have documents that include K−2 of the initially provided possible list elements and that satisfy the query suffix. This set of queries (the third query) will include $(k^2-k)/2$ queries where each query excludes two of the initially provided possible list elements (thus, each individual query has the same "cardinality" as every other query in the third query set).

Two of the set of queries formatted for Google (and assuming the following six possible list elements: gfaff, janomme, elna, ricccar, allbrands, and husqvarnaa) could be:

-gfaff -janomme +elna +ricccar +allbrands +husqvarnaa "sewing machine OR machines"
-gfaff +janomme -elna +ricccar +allbrands +husqvarnaa "sewing machine OR machines"
. . .

By comparing the sizes of the document spaces found by the 'all elements query' procedure 803, the 'all-minus-one elements query' procedure 805 and the 'all-minus-two elements query' procedure 807 we can determine characteristics about the initially provided possible list elements. In particular, by analyzing the sizes of these document spaces we can determine which of the initially provided possible list elements are inconsistent with the other elements. For example, we can detect as many as two misspelled elements; detect which of the correct elements from the possible list elements are minor contributors to the document space and detect when the two of the possible list elements contribute to different portions of the document space. We can also identify how strongly each of the possible list elements is identified with the category term.

Next, a 'sufficient results' decision procedure 809 determines whether or not the total document space is sufficiently large to continue processing. If not, we continue to an 'all-minus-n elements query' procedure 811 that continues searching for documents containing combinations of the initially provided possible list elements that include even fewer of the initially provided possible list elements. This can continue until the document space is of sufficient size or until too few of the initially provided possible list elements are available. One skilled in the art will understand how to implement the 'all-minus-n elements query' procedure 811 by recognizing that the 'all-minus-one elements query' procedure 805 and the 'all-minus-two elements query' procedure 807 are simply two instances of the 'all-minus-n elements query' procedure 811 where n=1 or 2. In the general case n can be any integer number less than the total number of initially provided possible list elements. However, due to the number of queries generated, n is generally less than 8.

Figure 9:
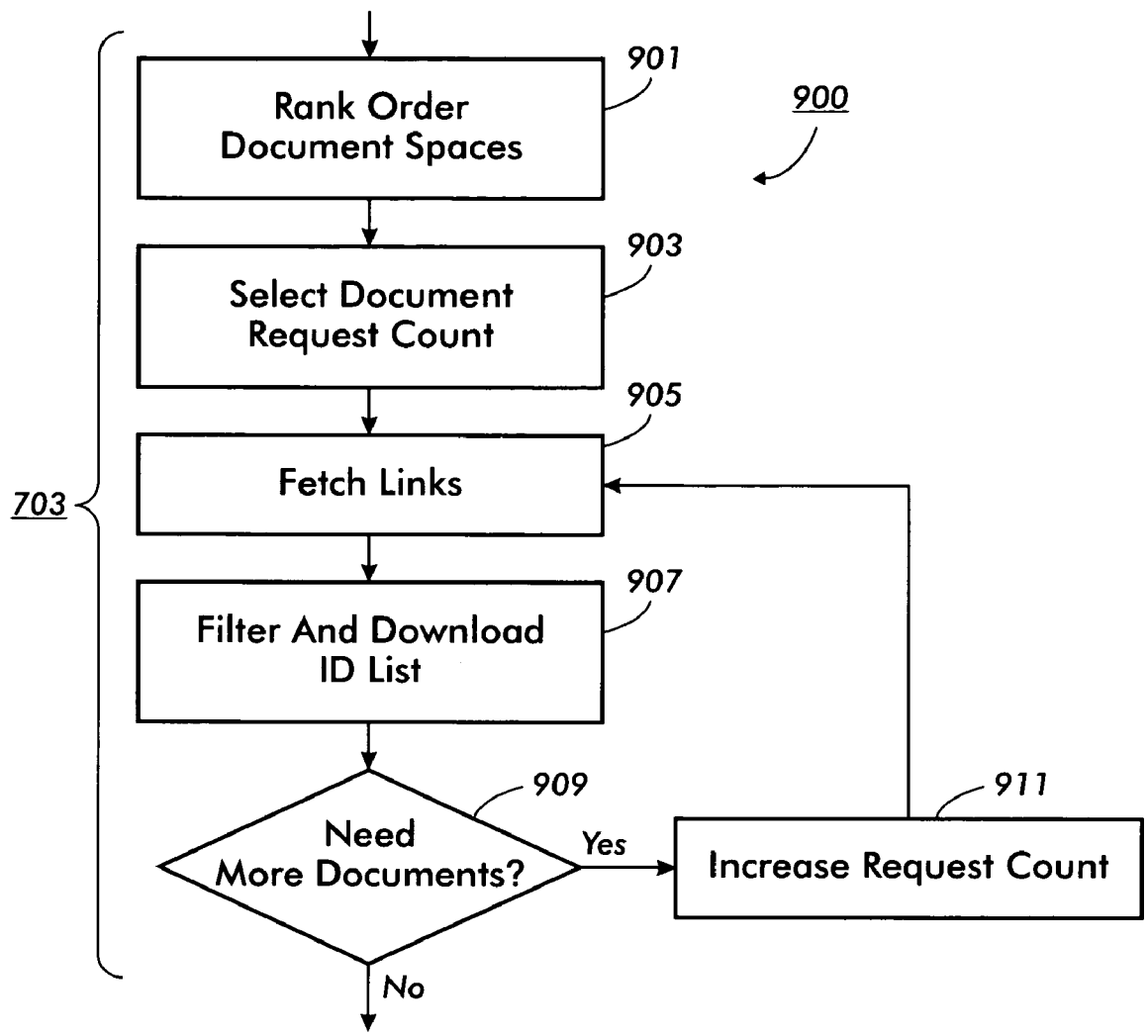
FIG. 9 illustrates a select document process that can be used in the process shown in FIG. 7.

FIG. 9 illustrates a select document process 900 that corresponds to the 'select documents' procedure 703 of FIG. 7. The select document process 900 continues to the 'extract list elements' procedure 705 or the 'present information' procedure 707 after enough search sets have been returned to have a sufficiently large total document space. The individual document spaces are rank ordered by a 'rank order document spaces' procedure 901 that sorts the document spaces so that those most likely to have the best grouping of possible list elements are placed early in the list. In one embodiment, we use three ordering rules:

1. If a document space A represents documents having more of the initial list elements than another document space B, A will precede B in the order.
2. If a document space A and a document space B represents documents that have the same number of initial possible list elements, and document space A is larger than document space B, then A will precede B in the order.
3. If a document space A and a document space B are still unordered after rules 1 and 2, then order them based on the tuple of initial possible list elements that were excluded in the associated query, where tuples with the highest minimum number take precedence. For example, with N=2 and k=6, (4,5) precedes (2,5). In case of ties, the highest next-to-minimum takes precedence and so on. For example, (4,6) precedes (4,5).

These ordering rules determine the document spaces that are most likely to contain references to documents that contain lists of the initial possible list elements and are most likely to contain correct elements. The first rule gives precedence to documents that contain more of the initial possible list elements. The more initial possible list elements a page contains, the more likely it is to have them in a list.

The second rule is based on the observation that larger document spaces usually result from excluding one or more of the weaker list elements. Recall the discussions related to the 'all-minus-one elements query' procedure 805 and the 'all-minus-two elements query' procedure 807. Thus, documents in these document spaces contain list elements that are likely to be stronger.

The third rule is valuable in the case that the initial possible list elements are themselves numbered in decreasing order of strength, based on the determination of earlier processing steps (or if the list of initially provided possible list elements come directly from the user). So the first element number will be the strongest, the second element will be the second strongest and so forth. In this case, queries that exclude higher numbered (weaker) possible list elements are more likely to produce good documents than those that exclude lower numbered (stronger) elements.

Once the document spaces are ranked, a 'select document request count' procedure 903 determines how many document identifications (such as URLs) should be requested from the search engine for each document space (some of document identifications may have already been retrieved while determining the size of the document space). In one embodiment, we set the Document Request Count r initially to a value that is somewhat larger the then number of documents we intend to analyze, but not much larger. If r is set too small, the select document process 900 will subsequently increase it. The r value is used to balance the impact on the search engine with the time required to get a result from the search engine. One aspect of web based search engines is that they often change the number of results that can be returned on a single query. Thus, some embodiments will cache returned document identifications and use multiple requests to obtain the required r document identifications. The Document Request Count is satisfied by first using document identifications contained in the highest ranked document space. If the highest ranked document space does not contain enough document identifications, document identifications from the next highest ranked document space are used. This continues until the Document Request Count is satisfied or no more document identifications are found.

A 'fetch document identifications' procedure 905 returns r document identifications from the document spaces in the rank order determined by the 'rank order document spaces' procedure 901, up to the Document Request Count (thus, not all of the document identifications in any set need be returned—and in fact, some of the document spaces may not contribute any document identifications). The returned document identifiers are first ordered using the document space rank and within each document space ordered as per the search engine's ranking. The returned document identifications are stored in the Document ID list.

Once the Document ID list is generated by the 'fetch document identifications' procedure 905, a 'filter and download ID list' procedure 907 removes document IDs from the list where the associated document appears to be too short, too long, has an unsupported format, or from a web site that is already over-represented in the Document ID List. After the document ID list has been so filtered, documents corresponding to the remaining document IDs can be downloaded. If the document no longer exists or if it takes too long to download, the document identification is removed from the Document ID list.

A 'more documents needed' decision procedure 909 then determines whether the number of downloaded documents is sufficient. If not, the select document process 900 loops back to the 'fetch document identifications' procedure 905 to select additional document IDs from the ranked document spaces. One embodiment of the invention will continue to increase r at step 911 until a sufficient number of documents are downloaded. If an insufficient number of documents have been downloaded after examining all of the documents in the ranked document spaces, the next approach is to relax the filters. Eventually, so long as there are some downloaded documents, the select document process 900 continues to an extract list elements process 1000.

Figure 10:
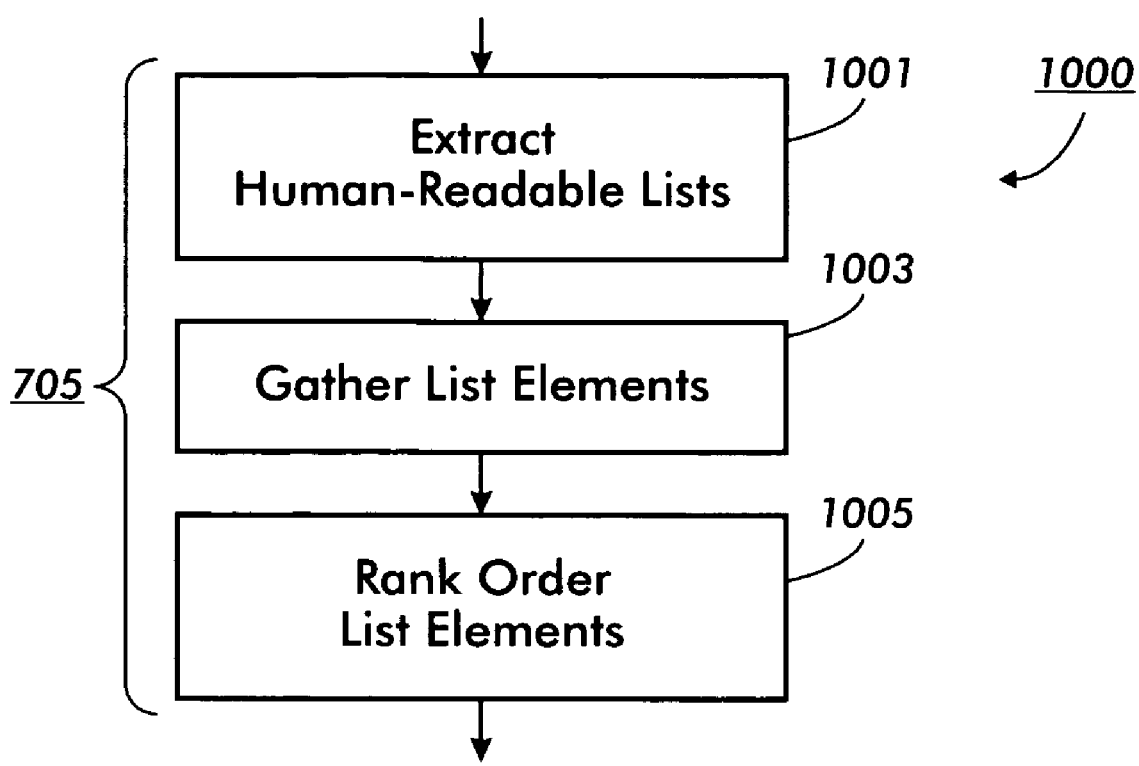
FIG. 10 illustrates an extract list elements process that can be used in the process shown in FIG. 7.
Figure 11:
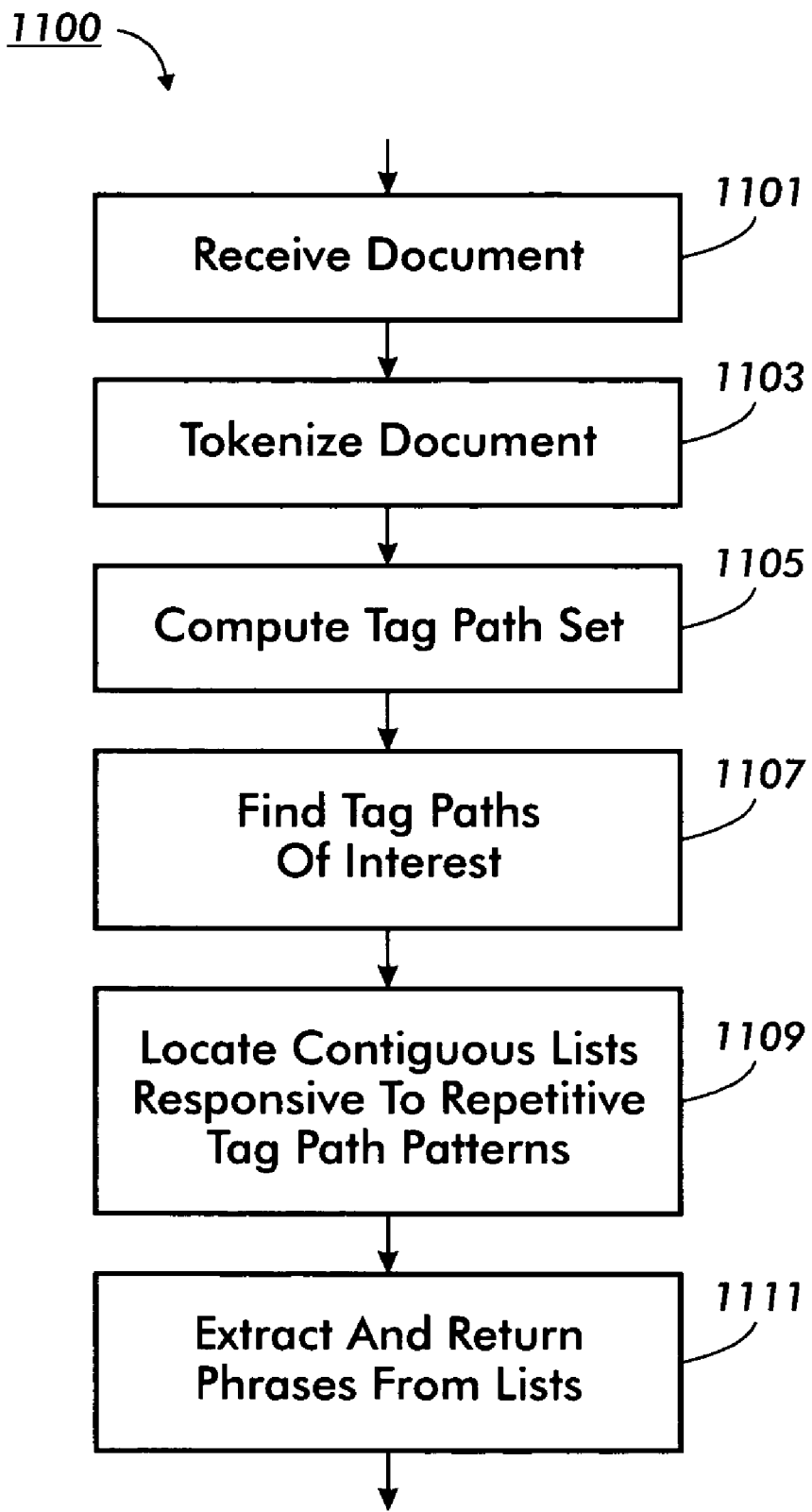
FIG. 11 illustrates an implicit list extraction process used in the process of FIG. 10.
Figure 12:
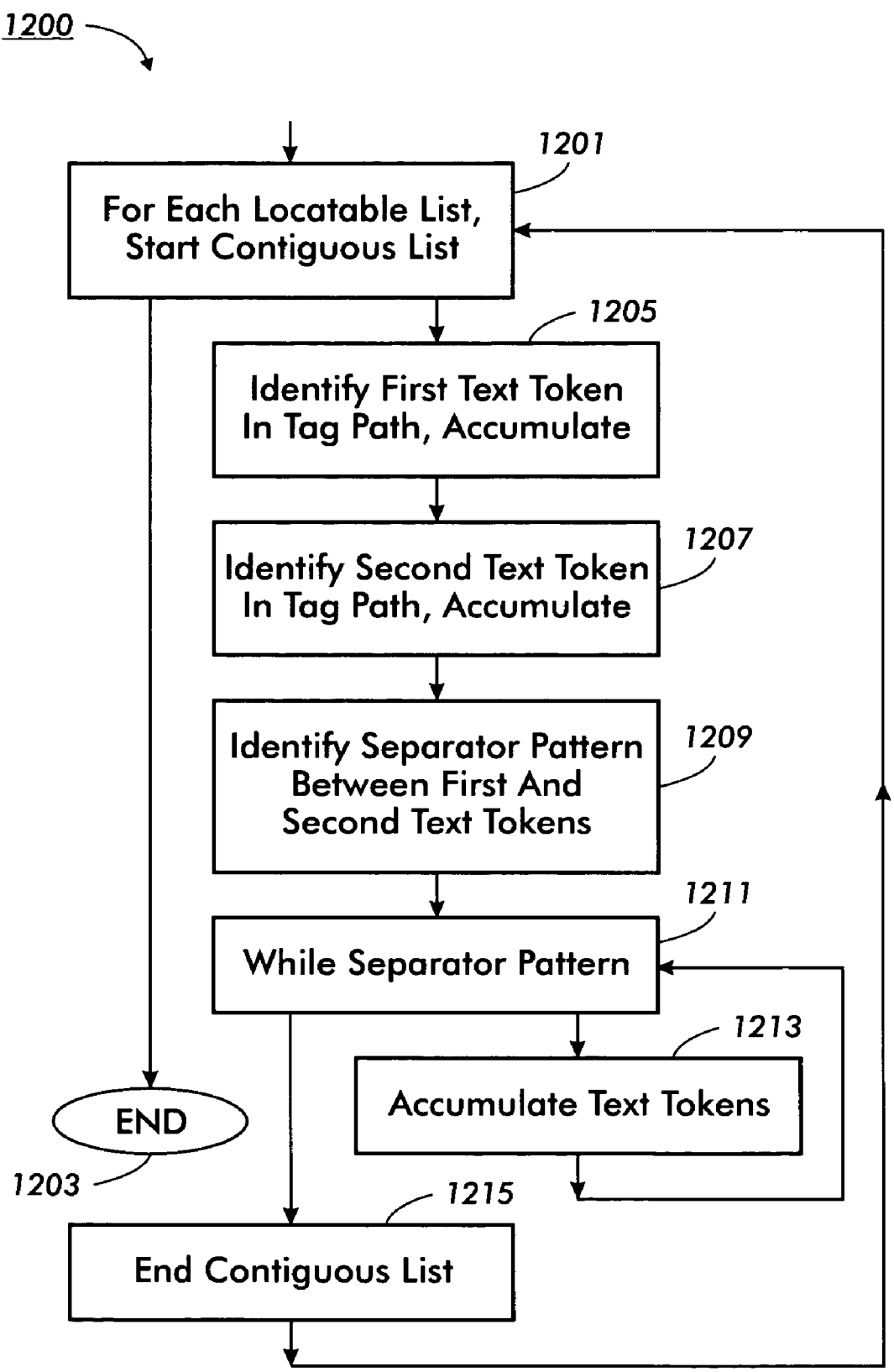
FIG. 12 illustrates one embodiment of a contiguous list detection process that can be used in FIG. 11.

FIG. 10 illustrates the extract list elements process 1000 that corresponds to the 'extract list elements' procedure 705 of FIG. 7. At this point, one embodiment of the invention has a number of downloaded documents that have a high likelihood of containing lists that contain several of the initially provided list elements. One aspect of the extract list elements process 1000 uses an 'extract human-readable lists' procedure 1001 to parse the downloaded documents for explicit list operators that generate human readable lists. For example, if the downloaded document uses HTML formatting, one aspect of the invention parses the HTML for explicit list structure tags (such as: <OL>, <UL>, and <DL>). In addition, the <TABLE> tag creates a tabular structure that can be considered to be a list and the <SELECT> tag begins a pull-down menu that may also contain a list of list elements. In addition, there are other implicit combinations of HTML commands that can be used to format a list without using the previously described explicit HTML list tags. One additional aspect of the invention, that is subsequently described with respect to FIG. 11 and FIG. 12, is a novel technique for extracting a human readable list formatted using sequences of page layout commands that implicitly produce a layout that will have the shape and appearance of a list (as compared to explicit list or table commands such as the previously described tags).

Because a document may contain multiple lists, the 'extract human-readable lists' procedure 1001 returns a set of lists and/or list elements. It also returns the textual content from each list element and identifies which of the parts of the textual content is most likely to be a list element.

Documents in other formats can be similarly processed to locate the human-readable lists. In addition, another approach would be to direct the application that can print the formatted document to produce for example, a Postscript or PCL data file representing the printed material. Once such a data file is generated, it can be processed by a program to identify lists, tables, and the contents of these.

Next, a 'gather list elements' procedure 1003 combines all the phrases from the set of lists into a single list of phrases while recording for each phrase the number of lists (the listcount) within which the phrase occurred. The list of phrases along with the listcount is the Augmented Element List.

A 'rank order list elements' procedure 1005 can compute scores for each of the located list elements using the same (or similar) techniques as previously described (such as Web Site filtering, External Score determination, Internal Score determination, and the elimination of discovered list elements that have too low of a score.

In some embodiments, the Augmented Element List can be used to expand the list of candidate phrases found by the previously described techniques.

While many HTML pages use explicit tags for generating lists, other HTML pages use implicitly created lists providing a similar sequence of tags between each element of the list.

FIG. 11 illustrates an implicit list extraction process 1100 that can be used to extract implicitly formatted human readable lists from a document. The implicit list extraction process 1100 can be invoked by the 'extract human-readable lists' procedure 1001 or the 'gather list elements' procedure 1003. In other embodiments, the implicit list extraction process 1100 can be invoked as a stand-alone process or as a component to some other process. The subsequent description is related to extracting human readable lists from files that contain HTML data that uses sequences of implicit page layout commands to format information into human readable lists as compared to the previously discussed explicit HTML <OL>, <UL>, <DL>, <TABLE>, and <SELECT> tags. Similar techniques can be used with SGML or XML formatted files that use nested tagged elements delimited by start and end tags (or their equivalents), and where a repetitive pattern exists between list elements. Some desired list characteristics can be specified by input or by preference to the implicit list extraction process 1100. These characteristics can include parameters such as the number of list elements that are required to be in the list (a list size parameter), a set of required list elements, etc.

A 'receive document' procedure 1101 receives the appropriately formatted file (the file can be formatted using a document formatting description (DFD) using a markup language (ML) such as HTML, XML, SGML and/or using a Page Description Language (PDL) such as the Postscript® PDL, the PCL® PDL, etc.; it is intended that the term "document formatting description" encompass both PDLs and markup languages). The subsequently described embodiment is directed towards HTML formatted data. However, one skilled in the art would understand how to apply the inventive concepts to files containing data in other DFD formats. For example, for PDLs, one embodiment of the invention can interpret the PDL data and generate resulting intermediate ML data (such as HTML), or semantic representation of the resulting document image. Further, such a one would also understand how to translate from one DFD to another DFD.

A 'tokenize document' procedure 1103 parses the data in the document to identify tags, comments and text strings. Heuristic rules are used, as well as other techniques, to make on-the-fly corrections to badly formed HTML. A token is generated for each HTML tag and each contiguous string of non-tag text. In one embodiment a token is generated for each contiguous string of non-tag text (in another embodiment, a single string of non-tag text can result in multiple contiguous tokens).

Once the document has been tokenized, a 'compute tag path set' procedure 1105 computes a set of tag paths for the text tokens. These tag paths identify the tag context for each text element in the tokenized document.

The results the 'compute tag path set' procedure 1105 can be a tree structure where the textual tokens and non-container tags form the leaves of the tree and the matching pairs of container tokens (such as start and end tags) form the internal nodes of the tree. This structure can also be represented by a character string containing one text line for each textual token. This is best shown by example (notice the space after the ":"):

The following HTML (where "http:" is replaced by "xxxxx"):

<font size="+1"><b>Click here: <a href="xxxxx//www.sony.com">SONY Pages</a></b></font> can be represented as:

font|b|:Click here: ~
font|b|a|:SONY Pages~ where the "Click here" textual token is contained in a <b> context, which in turn is contained in a <font> context. The "SONY Pages" textual token is contained in an <a> context, which is contained in the <b> context, which is contained in the <font> context.

Once the tag path set is created the implicit list extraction process 1100 continues to a 'find tag-paths-of-interest' procedure 1107. At this point, each textual token has an associated tag path (context) defined by matching pairs of container tokens. The 'find tag-paths-of-interest' procedure 1107 collects all of the tag paths from all textual tokens in the document and removes duplicates to compute the full tag path set for the document. Each tag path in this set is associated with, and provides a context for, one or more textual tokens in the document. Furthermore, because the textual tokens in the document are ordered, based on the order in which they appeared in the original HTML, we can also identify the first textual token belonging to each tag path, the second textual token, and so on. The 'find tag-paths-of-interest' procedure 1107 also identifies those tag paths that satisfy our initial criteria for containing valid human readable lists. For example, if we are only interested in lists with at least 6 elements, then we discard from consideration any tag paths that are associated with fewer than 6 text tokens. In addition, the 'find tag-paths-of-interest' procedure 1107 can identify lists that contain some number of phrases from a list of phrases (for example a list of candidate phrases or other required list elements) by iterating through all of tag paths in the document. For each iterated tag path, we iterate through all of its textual tokens. The tag path is of-interest if these textual tokens match at least the required number of phrases from the list of key phrases and/or if some of the textual tokens match a set of required list elements.

Once the tag paths-of-interest have been determined, a 'locate contiguous lists' procedure 1109 locates phrases in the tag paths-of-interest that are likely to be in a human-readable list. The 'locate contiguous lists' procedure 1109 is subsequently described with respect to FIG. 12.

Once the contiguous lists are identified, an 'extract and return phrases from lists' procedure 1111 first determines whether the contiguous lists satisfy the desired list characteristics and if not the list is discarded (some of this filtering may have been accomplished in the 'find tag-paths-of-interest' procedure 1107. At this point, the remaining contiguous lists can be returned.

In some embodiments, the 'extract and return phrases from lists' procedure 1111 can also examine the list elements for portions of phrases that have increased interest. For example, in a list that has the same text after a brand name (Bernina sewing machines, . . . , White sewing machines) the interesting data is the brand name. We can also match text patterns to determine which words in the list are of interest. The text matching can be accomplished by the method previously described with respect to the 'extract phrases for each page in initial page set' procedure 407. We can also detect lists detecting comma- or colon- or semicolon-separated lists within a textual token.

FIG. 12 illustrates a contiguous list detection process 1200 that can be used to extract contiguous lists using the container tokens and textual tokens. The contiguous list detection process 1200 can be invoked by the 'locate contiguous lists' procedure 1109 of FIG. 11. A 'locate list' iterative procedure 1201 iterates through the tokens to find a locatable list. Once the list is found, the 'locate list' iterative procedure 1201 starts a contiguous list record. After all lists have been processed, the contiguous list detection process 1200 completes through an 'end' terminal 1203.

At the start of each locatable list, an 'identify first text token' procedure 1205 identifies the first textual token in the tag path (context), and accumulates that entry into the contiguous list. An 'identify second text token' procedure 1207 advances to the second textual token having the same tag path (the same context) as the first textual token, and accumulates that entry into the contiguous list. An 'identify separator pattern' procedure 1209 examines the tokens between the first and second textual tokens and creates a representation of those tokens (the separator pattern) by discarding tag attributes and white space. A 'while separator pattern' iterative procedure 1211 then checks for the existence of the separator pattern after the second text token. If the separator pattern exists, the next textual token is considered to be the next element in the list. An 'accumulate text token' procedure 1213 extracts the subsequent text token and accumulates the text token to the list. The first textual token is considered to be adjacent to the second textual token as they are separated by only the separator pattern. Each textual token that is separated from the previous textual token by only the separator pattern is considered to be adjacent to the previous textual token. The adjacent textual tokens are considered to be contiguous until one textual token is separated from the previous textual token by something other than the separator pattern.

When all of the contiguous textual tokens have been extracted (such as when tokens following the last extracted textual token does not match the separator pattern), the contiguous list detection process 1200 continues to an 'end contiguous list' procedure 1215 that closes the contiguous list just created. Then the contiguous list detection process 1200 continues to the 'locate list' iterative procedure 1201 to locate and process the next existing contiguous list. Multiple contiguous lists can be detected, for example, by noticing context changes and/or changes in the separator pattern.

This embodiment is one way of extracting human-readable lists from HTML documents. Other page formatting languages (even those that do not have matching tag delimiters) can be processed in a similar manner; that being: 1) parsing the page according to its formatting language, 2) locating a list element, accumulating list elements based on a position or repetitive sequence of commands used to position the subsequent list elements, and 3) accumulating the list elements so found.

One aspect of the invention is an automatic algorithm for discovering lists of brands, breeds, and other search type selections that can be defined by a linguistic fact and that have database sites (web sites) that include significant references to a candidate phrase related to a category term. One advantage of this aspect is that the generated list can be presented directly to a user who is interested in such a list, along with the evidence supporting the inclusion of each phrase in the list. This greatly reduces the number queries required and the number of documents that must be read by the user.

Another aspect of the invention performs tests on candidate phrases for accuracy and it also combines evidence from multiple web pages.

Another aspect of the invention is that the candidate phrases can be used as input to further information retrieval algorithms that proceed to discover additional information about each of the candidate phrases. For example, in the DVD players example, additional algorithms can discover, for each brand, what models of DVD players are associated with the brand, where these models of DVD players are described on the web, what features they have, which magazines have reviewed them, and so on.

From the foregoing, it will be appreciated that aspects of the invention have (without limitation) the following advantages:

1. With no training, modest storage, and very little information from the user, aspects of the invention can automatically deduce a list of likely candidate phrases related to a given category term (for example, brand of device, breeds of animal species books by author, music by performer, and categories of shapes, colors, cities, states, countries, currencies etc.).
2. The results are up to date as they are based on the latest information available from the database (for example, the World Wide Web).
3. Very little knowledge is required that is specific to the examples provided herein, thus, implementations using aspects of the invention can be easily targeted to find other kinds of information.
4. Incorrect elements in a candidate phrase list can be detected and corrected.
5. A partial list of candidate phrases can be used to discover a more complete list.
6. Human readable lists can be extracted from documents using combinations of list formatting commands that implicitly describe a list. As a result, list information can be found on a larger number of pages than just those with explicitly formatted lists. This allows member elements to be found in fewer calls to the search engine and with greater certainty even when documents about the category are relatively rare.
7. Aspects of the invention require fewer searches because this technology focuses on the most probable candidate phrases, constructs queries that explicitly exclude one or more candidate phrases, and considers the document sets in an order most likely to discover good pages of lists.
8. An initially defined search collection is not required.
9. The invention does not rely only on the local text and tags that precede and/or follow each candidate phrase but also relies on the full tag path context, which includes information about tags that may be distant from any individual candidate phrase.
10. Aspects of the invention evaluate each candidate phrase based on the total number of pages on the web that mention the category term, where the web site is closely associated with the candidate phrase (our internal ranking).

11. The invention avoids divergence by using only the highest-ranked phrases to find pages with other candidates.
12. Aspects of the invention can be run multiple times to produce a more accurate list of phrases. It tends to converge to actual elements of the desired set, rather than to drift off-topic, even when used repeatedly.
13. The results that are returned by the invention are rank-ordered so that the phrases most supported by the evidence can easily be found and used.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed

What is claimed follows:

1. A computer-controlled method, said method comprising steps of:
   receiving a plurality of possible list elements;
   determining a first document space size responsive to a first query that incorporates said plurality of possible list elements and defines a first document space;
   determining a plurality of sizes of second document spaces using a second query set containing a plurality of separate queries each of which incorporates a different proper subset of a plurality of candidate phrases and wherein each of said different proper subset has the same cardinality and defines one of said plurality of second document spaces, and wherein each of said second document spaces excludes one or more of said plurality of candidate phrases different than the one or more of said plurality of candidate phrases excluded in the remaining of said second document spaces;
   ranking said first document space and said plurality of said second document spaces;
   identifying a plurality of identified documents responsive to the step of ranking;
   extracting a plurality of list elements from at least one of said plurality of identified documents, wherein said at least one of said plurality of identified documents contains data and the step of extracting further comprises:
      parsing said data into a plurality of tokens comprising a plurality of container tokens and a plurality of textual tokens;
      determining a context for some of the plurality of textual tokens responsive to some of the plurality of container tokens;
      determining a separator pattern between one of said plurality of textual tokens and an adjacent textual token where both the one of said plurality of textual tokens and said adjacent textual token have said context; and
      identifying at least one of the plurality of textual tokens responsive to the separator pattern, wherein said at least one of the plurality of textual tokens is one of said plurality of list elements extracted by the step of extracting; and
   presenting one or more of said plurality of list elements.

2. The computer-controlled method of claim 1, wherein the step of ranking is responsive to said first document space size and said plurality of sizes of second document spaces.

3. The computer-controlled method of claim 1, wherein the step of ranking further comprises applying one or more ordering rules.

4. The computer-controlled method of claim 1, wherein each of said plurality of separate queries specifies a search for all-but-N of said plurality of possible list elements.

5. The computer-controlled method of claim 4, wherein N is selected from the group of consisting of 2, 3, 4, 5, 6, and 7.

6. The computer-controlled method of claim 1, wherein the step of extracting further comprises identifying a human readable list in one of said plurality of identified documents.

7. The computer-controlled method of claim 6, wherein the step of extracting further comprises identifying said plurality of list elements from within said human readable list.

8. The computer-controlled method of claim 1, further comprising comparing said first document space size to each of said plurality of sizes of second document spaces to determine how strongly each of said plurality of possible list elements is identified with a category term or to determine which of said plurality of possible list elements are inconsistent with other of said plurality of possible list elements.

9. The computer-controlled method of claim 1, wherein said at least one of said plurality of identified documents contains data and the step of extracting further comprises:
   parsing said data for at least one explicit list operator associated with a list; and
   extracting one of said plurality of list elements from within said list.

10. The computer-controlled method of claim 9, wherein the step of extracting one of said plurality of list elements is conditional, the method further comprising determining a number of list elements in said list and conditionally extracting said one of said plurality of list elements from within said list responsive to said number.

11. The computer-controlled method of claim 1, wherein the step of extracting is conditional responsive to the number of said plurality of list elements that match any of said plurality of possible list elements.

12. The computer-controlled method of claim 1, wherein said at least one of said plurality of identified documents contains data in accordance with at least one document formatting description format selected from a group consisting of HTML, SGML, XML, PCL, Postscript and ASCII text.

13. A computer program product comprising:
   a computer usable data carrier having computer readable instructions embodied therein which cause a computer to perform a method, said method comprising:
   receiving a plurality of possible list elements;
   determining a first document space size responsive to a first query that incorporates said plurality of possible list elements and defines a first document space;
   determining a plurality of sizes of second document spaces using a second query set containing a plurality of separate queries each of which incorporates a different proper subset of a plurality of candidate phrases and wherein each of said different proper subset has the same cardinality and defines one of said plurality of second document spaces, and wherein each of said second document spaces excludes one or more of said plurality of candidate phrases different than the one or more of said plurality of candidate phrases excluded in the remaining of said second document spaces;
   ranking said first document space and said plurality of said second document spaces;
   identifying a plurality of identified documents responsive to the step of ranking;

extracting a plurality of list elements from at least one of said plurality of identified documents, wherein said at least one of said plurality of identified documents contains data and the step of extracting further comprises:

parsing said data into a plurality of tokens comprising a plurality of container tokens and a plurality of textual tokens;

determining a context for some of the plurality of textual tokens responsive to some of the plurality of container tokens;

determining a separator pattern between one of said plurality of textual tokens and an adjacent textual token where both the one of said plurality of textual tokens and said adjacent textual token have said context; and identifying at least one of the plurality of textual tokens responsive to the separator pattern, wherein said at least one of the plurality of textual tokens is one of said plurality of list elements extracted by the step of extracting; and presenting one or more of said plurality of list elements.

14. The computer program product of claim 13, wherein the step of ranking is responsive to said first document space size and said plurality of sizes of second document spaces.

15. The computer program product of claim 13, wherein the step of ranking further comprises applying one or more ordering rules.

16. The computer program product of claim 13, wherein each of said plurality of separate queries specifies a search for all-but-N of said plurality of possible list elements.

17. The computer program product of claim 16, wherein N is selected from the group of consisting of 2, 3, 4, 5, 6, and 7.

18. The computer program product of claim 13, wherein the step of extracting further comprises identifying a human readable list in one of said plurality of identified documents.

19. The computer program product of claim 18, wherein the step of extracting further comprises identifying said plurality of list elements from within said human readable list.

20. The computer program product of claim 13, further comprising comparing said first document space size to each of said plurality of sizes of second document spaces to determine how strongly each of said plurality of possible list elements is identified with a category term or to determine which of said plurality of possible list elements are inconsistent with other of said plurality of possible list elements.

21. The computer program product of claim 13, wherein said at least one of said plurality of identified documents contains data and the step of extracting further comprises:

parsing said data for at least one explicit list operator associated with a list; and extracting one of said plurality of list elements from within said list.

22. The computer program product of claim 21, wherein the step of extracting one of said plurality of list elements is conditional, the product further comprising determining a number of list elements in said list and conditionally extracting said one of said plurality of list elements from within said list responsive to said number.

23. The computer program product of claim 13, wherein the step of extracting is conditional responsive to the number of said plurality of list elements that match any of said plurality of possible list elements.

24. The computer program product of claim 13, wherein said at least one of said plurality of identified documents contains data in accordance with at least one document formatting description format selected from a group consisting of HTML, SGML, XML, PCL, Postscript and ASCII text.

25. An apparatus having a central processing unit (CPU) and a memory coupled to said CPU, said apparatus comprising:

a receiving mechanism configured to receive a plurality of possible list elements;

a first determination mechanism configured to determine a first document space size responsive to a first query that incorporates said plurality of possible list elements and defines a first document space;

a second determination mechanism configured to determine a plurality of sizes of second document spaces using a second query set containing a plurality of separate queries each of which incorporates a different proper subset of a plurality of candidate phrases and wherein each of said different proper subset has the same cardinality and defines one of said plurality of second document spaces, and wherein each of said second document spaces excludes one or more of said plurality of candidate phrases different than the one or more of said plurality of candidate phrases excluded in the remaining of said second document spaces;

a prioritization mechanism configured to rank said first document space and said plurality of said second document spaces;

a selection mechanism configured to identify a plurality of identified documents responsive to the prioritization mechanism an extraction mechanism configured to extract a plurality of list elements from at least one of said plurality of identified documents, wherein said at least one of said plurality of identified documents contains data and the extraction mechanism further comprises:

a parser configured to parse said data into a plurality of tokens comprising a plurality of container tokens and a plurality of textual tokens;

a context determination mechanism configured to determine a context for some of the plurality of textual tokens responsive to some of the plurality of container tokens;

a pattern determination mechanism configured to determine a separator pattern between one of said plurality of textual tokens and an adjacent textual token where both the one of said plurality of textual tokens and said adjacent textual token have said context; and a list element identification mechanism configured to identify at least one of the plurality of textual tokens responsive to the separator pattern, wherein said at least one of the plurality of textual tokens is one of said plurality of list elements extracted by the extraction mechanism; and a presentation mechanism configured to present one or more of said plurality of list elements.

26. The apparatus of claim 25, wherein the prioritization mechanism is responsive to said first document space size and said plurality of sizes of second document spaces.

27. The apparatus of claim 25, wherein the prioritization mechanism further comprises a rule mechanism configured to apply one or more ordering rules.

28. The apparatus of claim 25, wherein each of said plurality of separate queries specifies a search for all-but-N of said plurality of possible list elements.

29. The apparatus of claim 28, wherein N is selected from the group of consisting of 2, 3, 4, 5, 6, and 7.

30. The apparatus of claim 25, wherein the extraction mechanism further comprises a list identification mechanism configured to identify a human readable list in one of said plurality of identified documents.

31. The apparatus of claim 30, wherein the extraction mechanism further comprises a list element identification mechanism configured to identify said plurality of list elements from within said human readable list.

32. The apparatus of claim 25, further comprising a comparison mechanism configured to compare said first document space size to each of said plurality of sizes of second document spaces to determine how strongly each of said plurality of possible list elements is identified with a category term or to determine which of said plurality of possible list elements are inconsistent with other of said plurality of possible list elements.

33. The apparatus of claim 25, wherein said at least one of said plurality of identified documents contains data and the extraction mechanism further comprises:

a parser configured to parse said data for at least one explicit list operator associated with a list; and a list element extraction mechanism configured to extract one of said plurality of list elements from within said list.

34. The apparatus of claim 33, wherein the list element extraction mechanism is conditional, the apparatus further comprising a list size determination mechanism configured to determine a number of list elements in said list and conditionally extracting said one of said plurality of list elements from within said list responsive to said number.

35. The apparatus of claim 25, wherein the extraction mechanism is conditional responsive to the number of said plurality of list elements that match any of said plurality of possible list elements.

36. The apparatus of claim 25, wherein said at least one of said plurality of identified documents contains data in accordance with at least one document formatting description format selected from a group consisting of HTML, SGML, XML, PCL, Postscript and ASCII text.

* * * * *